(12) United States Patent
Haruta

(10) Patent No.: US 10,706,340 B2
(45) Date of Patent: Jul. 7, 2020

(54) IMAGE PROCESSING APPARATUS AND METHOD FOR CONTROLLING THE SAME WITH CHARACTER ATTRIBUTE INDICATING THAT PIXEL IS PIXEL OF A CHARACTER

(71) Applicant: CANON KABUSHIKI KAISHA, Tokyo (JP)

(72) Inventor: Kenichirou Haruta, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/872,133

(22) Filed: Jan. 16, 2018

(65) Prior Publication Data

US 2018/0211143 A1    Jul. 26, 2018

(30) Foreign Application Priority Data

Jan. 25, 2017  (JP) ................................. 2017-011390

(51) Int. Cl.
G06F 3/12        (2006.01)
G06K 15/02       (2006.01)
H04N 1/409       (2006.01)

(52) U.S. Cl.
CPC ..... *G06K 15/1876* (2013.01); *G06K 15/1878* (2013.01); *H04N 1/4092* (2013.01)

(58) Field of Classification Search
CPC ........... G06K 15/1822; G06K 15/1872; G06K 15/1876; G06K 15/1878; G06K 15/1882; G06T 5/002; G06T 5/20; H04N 1/00482; H04N 1/393; H04N 1/401; H04N 1/4092; H04N 1/60; H04N 1/6072; G03G 15/043

USPC ................................ 358/1.1–1.18, 3, 15, 402
See application file for complete search history.

(56) References Cited

U.S. PATENT DOCUMENTS

| | | | |
|---|---|---|---|
| 8,331,731 B2 | 12/2012 | Kashibuchi | |
| 8,570,627 B2 | 10/2013 | Aoyagi | |
| 8,687,240 B2 * | 4/2014 | Fukamachi | H04N 1/405 347/131 |
| 8,976,408 B2 * | 3/2015 | Kobayashi | G06K 15/1872 358/1.2 |
| 8,982,407 B2 | 3/2015 | Yamada | |
| 9,349,185 B2 | 5/2016 | Kono et al. | |

(Continued)

FOREIGN PATENT DOCUMENTS

| | | |
|---|---|---|
| CN | 101277365 A | 10/2008 |
| CN | 102982529 A | 3/2013 |

(Continued)

OTHER PUBLICATIONS

Jun. 5, 2018 European Search Report in European Patent Appln. No. 18150033.1.

(Continued)

*Primary Examiner* — Gabriel I Garcia
(74) *Attorney, Agent, or Firm* — Venable LLP

(57) ABSTRACT

This image processing apparatus inputs a density value for each pixel of image data and an attribute indicating an object type to which the pixel belongs, processes one pixel of input image data as a pixel of interest in turn, and in accordance with at least the attributes of the pixel of interest and two pixels which sandwich the pixel of interest, executes image processing for replacing the density value of the pixel of interest with the density value of one pixel out of two pixels.

16 Claims, 18 Drawing Sheets

(56) References Cited

U.S. PATENT DOCUMENTS

| | | |
|---|---|---|
| 9,693,000 B2 | 6/2017 | Furuya |
| 9,939,754 B2 | 4/2018 | Haruta |
| 10,440,226 B2 | 10/2019 | Eguchi |
| 2008/0310758 A1 | 12/2008 | Kashibuchi |
| 2011/0158523 A1* | 6/2011 | Yamada ............... H04N 19/176 382/166 |
| 2011/0317232 A1 | 12/2011 | Aoyagi |
| 2013/0051680 A1 | 2/2013 | Kono et al. |
| 2013/0148133 A1 | 6/2013 | Kobayashi |
| 2014/0036278 A1 | 2/2014 | Yamada |
| 2015/0092244 A1 | 4/2015 | Yamada |
| 2015/0181076 A1 | 6/2015 | Mita |
| 2015/0244956 A1 | 8/2015 | Furuya |
| 2016/0266512 A1 | 9/2016 | Haruta |
| 2016/0381249 A1 | 12/2016 | Eguchi |
| 2017/0213115 A1* | 7/2017 | Eguchi ............... G06K 15/1847 |

FOREIGN PATENT DOCUMENTS

| | | |
|---|---|---|
| CN | 103581497 A | 2/2014 |
| CN | 104883519 A | 9/2015 |
| CN | 105975998 A | 9/2016 |
| JP | S61-080965 A | 4/1986 |
| JP | 2011-139162 A | 7/2011 |
| JP | 2012-010089 A | 1/2012 |
| JP | 2012-121265 A | 6/2012 |
| KR | 10-2017-0000792 A | 1/2017 |

OTHER PUBLICATIONS

Aug. 2, 2019 Chinese Official Action in Chinese Patent Appln. No. 201810073871.4.

May 5, 2020 Korean Official Action in Korean Patent Appln. No. 10-2018-0005835.

* cited by examiner

FIG. 4
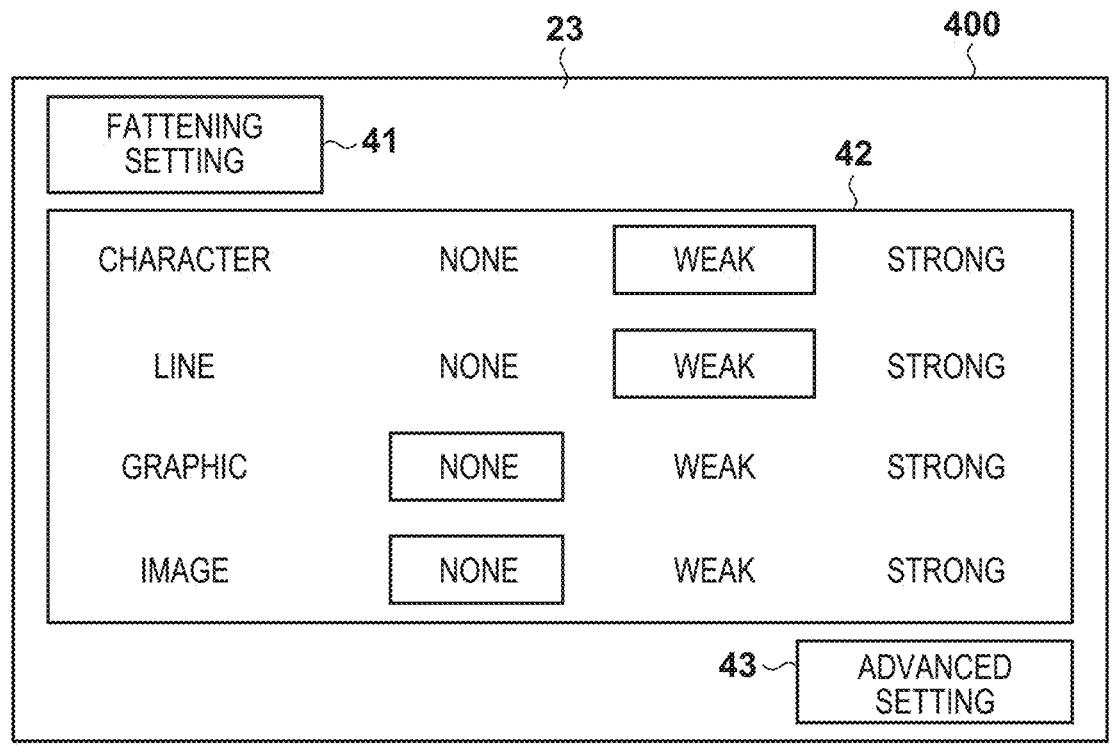
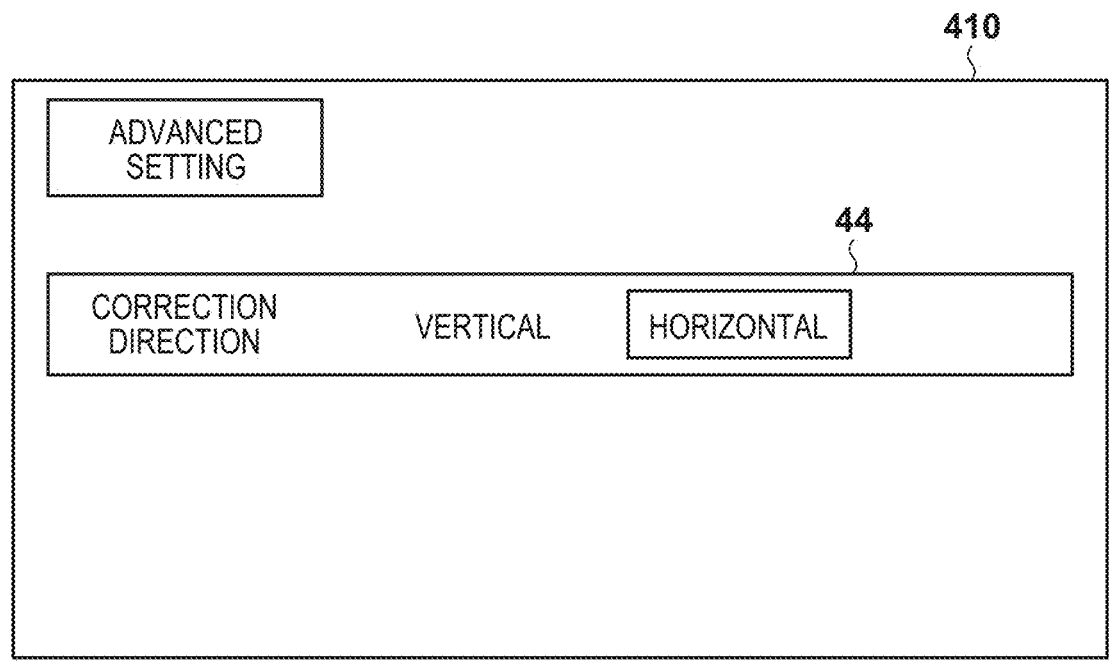

FIG. 5

| MANAGEMENT INFORMATION | ATTRIBUTE INFORMATION |
|---|---|
| REPLACING ATTRIBUTE | CHARACTER, LINE |
| REPLACED ATTRIBUTE | GRAPHIC, IMAGE, BACKGROUND |

500

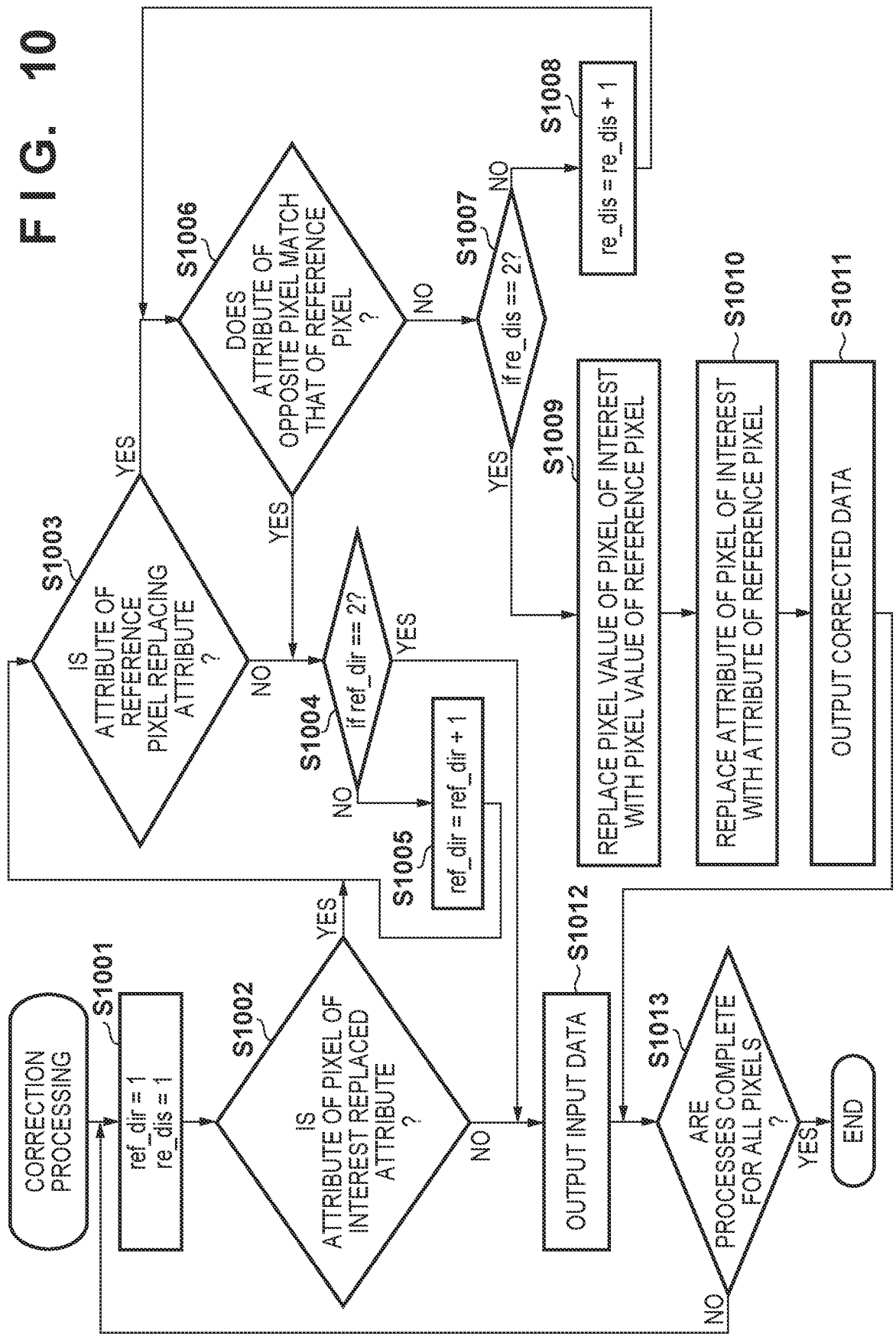

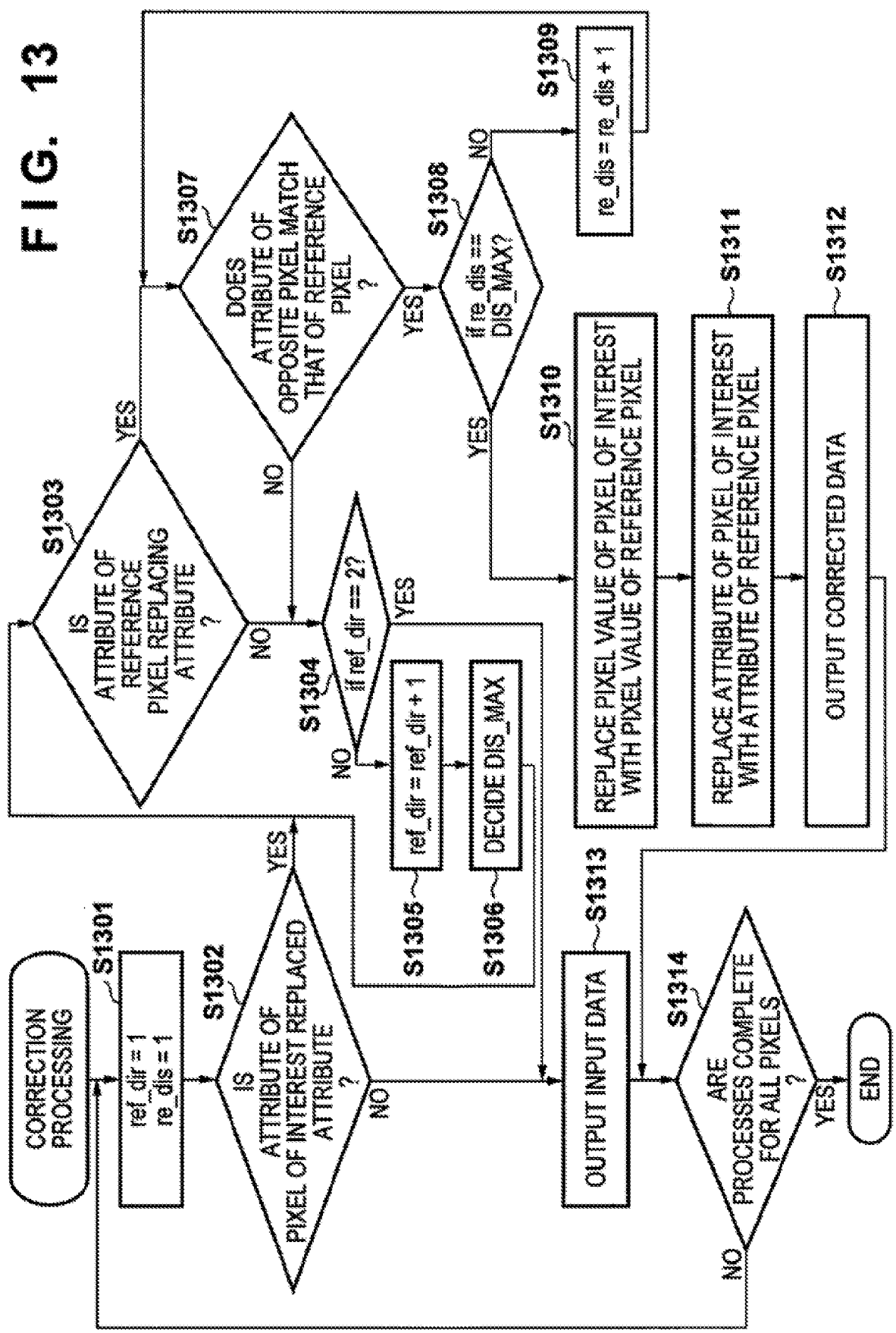

IMAGE PROCESSING APPARATUS AND METHOD FOR CONTROLLING THE SAME WITH CHARACTER ATTRIBUTE INDICATING THAT PIXEL IS PIXEL OF A CHARACTER

BACKGROUND OF THE INVENTION

Field of the Invention

The present invention relates to an image processing apparatus that executes image processing for making a character, a line, or the like more bold, and a method for controlling the same.

Description of the Related Art

As a print resolution increases, an image forming apparatus can print an extremely thin line or small character. Depending on an image forming apparatus, it may be difficult for a user to visually recognize such a small image object (a line, a character, or the like). To cope with this, there is a technique of correcting image data of the object so as to make it easier for the user to visually recognize the object. Japanese Patent Laid-Open No. 2012-121265 proposes a technique of making a character more bold or thickening the thickness of a thin line with reference to attribute information indicating the characteristic of an object in an image such as a character or a line.

The above related art, however, poses the following problem. For example, a character small in point (small point character) such as a 5-point character is narrow in a stroke interval, and thus the character collapses, and visibility decreases when the thickness of strokes is thickened uniformly. More specifically, in image processing in the above related art, the color value of a background pixel is changed based on the color value of a pixel having a character attribute if a boundary at which the pixel having the character attribute and a pixel having a background attribute are adjacent to each other is found. In such an arrangement, when, for example, three pixels adjacent to each other in the order of the character attribute, the background attribute, and the character attribute exist, the color value of the background pixel is changed based on the color values of the pixels each having the character attribute because there is a boundary between the character attribute and the background attribute. This results in three adjacent character attributes, and a character collapse occurs.

SUMMARY OF THE INVENTION

The present invention enables realization of a mechanism for executing image processing without a decrease in image quality such as a character collapse in consideration of attributes of a pixel of interest and a plurality of neighboring pixels.

One aspect of the present invention provides an image processing apparatus comprising: an input unit that inputs a density value for each pixel of image data and an attribute indicating an object type to which the pixel belongs; and an image processing unit that processes one pixel of the image data input by the input unit as a pixel of interest in turn, and in accordance with at least attributes of the pixel of interest and two pixels which sandwich the pixel of interest, executes image processing for replacing a density value of the pixel of interest with a density value of one pixel out of the two pixels.

Another aspect of the present invention provides a method for controlling an image processing apparatus, the method comprising: inputting a density value for each pixel of image data and an attribute indicating an object type to which the pixel belongs; and performing image processing for processing one pixel of the image data input in the inputting as a pixel of interest in turn, and in accordance with at least attributes of the pixel of interest and two pixels which sandwich the pixel of interest, executing image processing for replacing a density value of the pixel of interest with a density value of one pixel out of the two pixels.

Further features of the present invention will be apparent from the following description of exemplary embodiments with reference to the attached drawings.

BRIEF DESCRIPTION OF THE DRAWINGS

FIG. 4 shows views of image modification processing UI;

FIG. 5 is a table for explaining image correction processing according to the embodiment;

FIG. 10 is a flowchart of image correction processing according to an embodiment;

FIG. 13 is a flowchart of image correction processing according to an embodiment;

DESCRIPTION OF THE EMBODIMENTS

Figure 1:
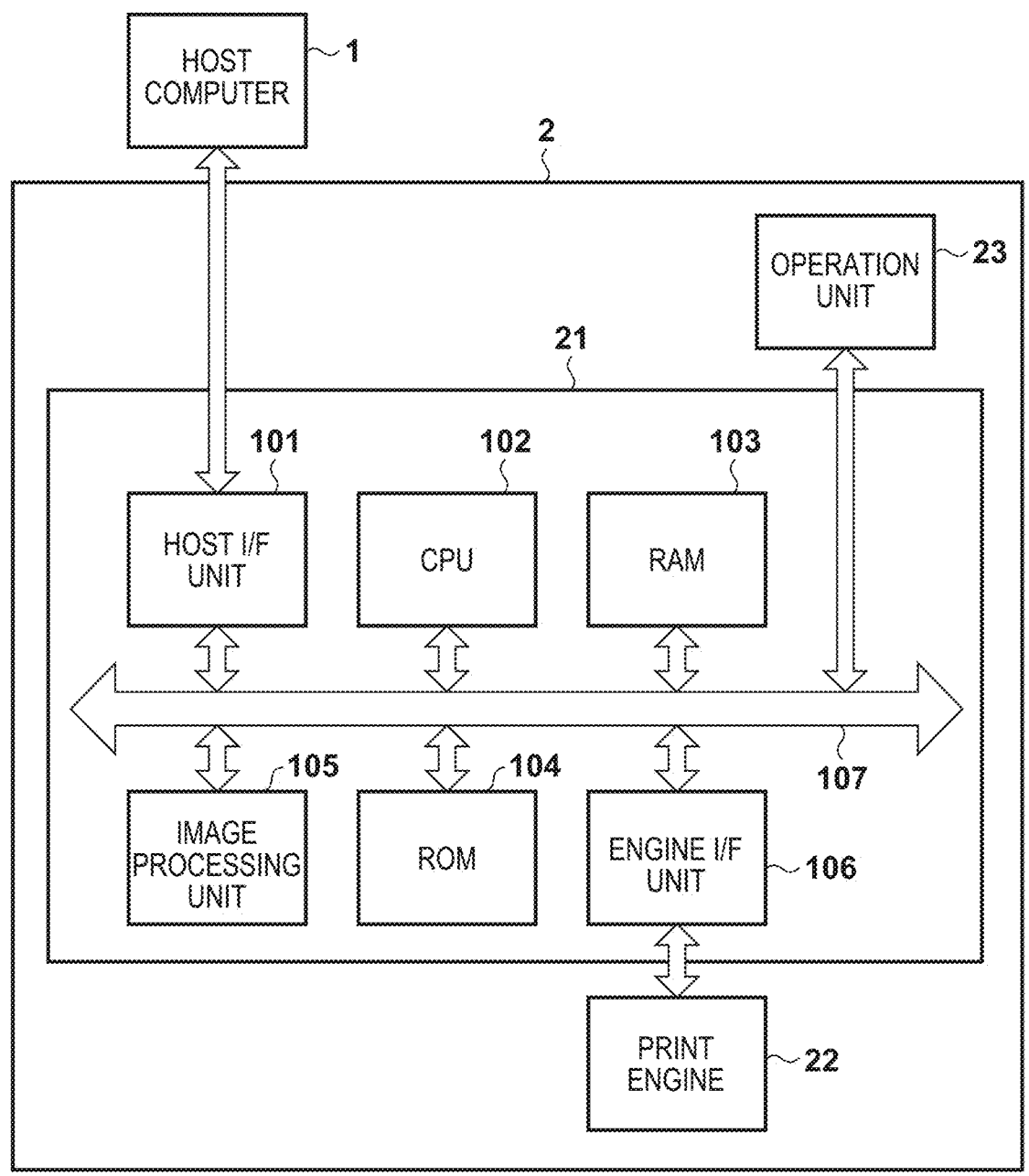
FIG. 1 is a schematic diagram showing a system arrangement according to an embodiment.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that, in descriptions of the following embodiments, the phrase "fatten a character" is synonymous with the phrase "make a character more bold", the phrase "thicken a line width of a character", and the phrase "thicken a pixel of a character".

First Embodiment

The first embodiment of the present invention will be described below. This embodiment will be described by taking an image forming apparatus as an example of an image processing apparatus of this embodiment. Note that the present invention is not limited to the image forming apparatus, is applicable to any apparatus capable of executing image processing to be described below, and is even applicable to an apparatus without an image forming function. The above-described image processing is image processing for fattening a character included in image data.

Image data of this embodiment is made of a plurality of pixels each having a pixel value (density value). In RGB image data, each pixel has luminance values of three components: R, G, and B components. In CMYK image data, each pixel has density values of four components: C, M, Y, and K components. Attribute data of this embodiment are associated with each other for each pixel of the image data and indicate the type of object to which each pixel belongs. In accordance with the kind of associated attribute, corresponding image processing is performed on each pixel. For example, smooth tonality is required of a pixel having an image attribute or a graphic attribute (first attribute), and thus processing which places importance on tonality is applied. Visibility is required of a pixel having a character attribute or a line attribute (second attribute), and thus processing which places importance on a resolution is applied. Therefore, when a pixel attribute is the image attribute (first attribute), a screen low in screen ruling (screen of the first screen ruling) is applied in a screen processing unit 204 to be described later. Then, a gamma table according to the screen low in screen ruling is applied in a gamma correction processing unit 203. When a pixel attribute is the character attribute (second attribute), a screen high in screen ruling (screen of the second screen ruling) is applied in the screen processing unit 204 to be described later. Then, a gamma table according to the screen high in screen ruling is applied in the gamma correction processing unit 203.

Thus, according to this embodiment, the attribute data is used in order to specify a character included in the image data. There are several methods for generating the attribute data. For example, when image data of a page is generated by rendering based on a PDL (Page Description Language) command, the attribute data is generated in accordance with the type of that PDL command. For example, for a PDL command for drawing a character, an attribute of a pixel that forms an object generated by the PDL command is a character attribute (TEXT). For a PDL command for drawing a line, an attribute of a pixel that forms an object generated by the PDL command is a line attribute. On the other hand, for a PDL command for drawing a vector graphic or image (a bitmap image or a raster image), an attribute of a pixel that forms an object generated by the PDL command is a graphic attribute or an image attribute. As described above, generated attribute data and generated image data are associated with each other. In this embodiment, the object formed by the pixel having the character attribute as the attribute is treated as a character.

System Arrangement

First, an example of a system arrangement according to this embodiment will be described with reference to FIG. 1. An image processing system shown in FIG. 1 is formed by a host computer 1 and an image forming apparatus 2. The image forming apparatus 2 of this embodiment is an example of the image processing apparatus of the present invention and includes a controller 21, a print engine 22, and an operation unit 23. Note that the operation unit 23 includes various switches, an LED display device, and the like for an operation.

The host computer 1 is an information processing apparatus, for example, a computer such as a general PC (Personal Computer) or WS (Work Station). An image or a document created by a software application such as a printer driver (not shown) on this host computer 1 is transmitted to the image forming apparatus 2 via a network (for example, a Local Area Network) as PDL data. In the image forming apparatus 2, the controller 21 receives the transmitted PDL data.

The controller 21 is connected to the print engine 22, receives the PDL data from the host computer 1, converts the received data into print data that can be processed by the print engine 22, and outputs the print data to the print engine 22. The print engine 22 prints an image based on the print data output by the controller 21. Note that the print engine 22 in this embodiment is an electrophotographic print engine as an example. The operation unit 23 is operated by a user and is used in order to select various functions or instruct an operation. The operation unit 23 includes, for example, a liquid crystal display with a touch panel being provided on its surface and a keyboard in which various keys such as a start key, a stop key, and a ten-key pad are arranged.

A detail of the controller 21 will be described next. The controller 21 includes a host I/F (interface) unit 101, a CPU 102, a RAM 103, a ROM 104, an image processing unit 105, and an engine I/F unit 106. The respective units can mutually transmit/receive data or the like via an internal bus 107.

The host I/F unit 101 is an interface for receiving PDL data transmitted from the host computer 1. The CPU 102 generally controls the entire image forming apparatus 2 by using programs and data stored in the RAM 103 and the ROM 104, and executes processing to be described later performed by the controller 21. The RAM 103 includes a work area used when the CPU 102 executes various kinds of processing. The ROM 104 stores programs and data for causing the CPU 102 to execute the various kinds of processing to be described later, and also stores setting data or the like of the controller 21. The engine I/F unit 106 is an interface that transmits print data generated by the image processing unit 105 to the print engine 22.

In accordance with a setting from the CPU 102, the image processing unit 105 performs printing image processing on the PDL data received by the host I/F unit 101 and generates print data that can be processed by the print engine 22. In particular, the image processing unit 105 rasterizes the received PDL data, generating image data including a plurality of color components per pixel. The plurality of color components are color components independent of each other in a color space such as R, G, and B (red, green, and blue). Image data has an 8-bit (256-tone) value per color component for each pixel. That is, the image data is multilevel bitmap data including multilevel pixels. In above rasterization, attribute data indicating a pixel attribute of the image data for each pixel is also generated in addition to the image data. This attribute data is a value indicating a specific kind of object to which the pixel belongs and indicating the kind of object such as a character, a line, a graphic, an image, or a background. The image processing unit 105 performs image processing such as screen processing or color conversion from an RGB color space to a CMYK (cyan, magenta, yellow, and black) color space by using the generated image data and attribute data, generating print data. A detail of the image processing unit 105 will be described later.

Image Processing Unit

Figure 2:
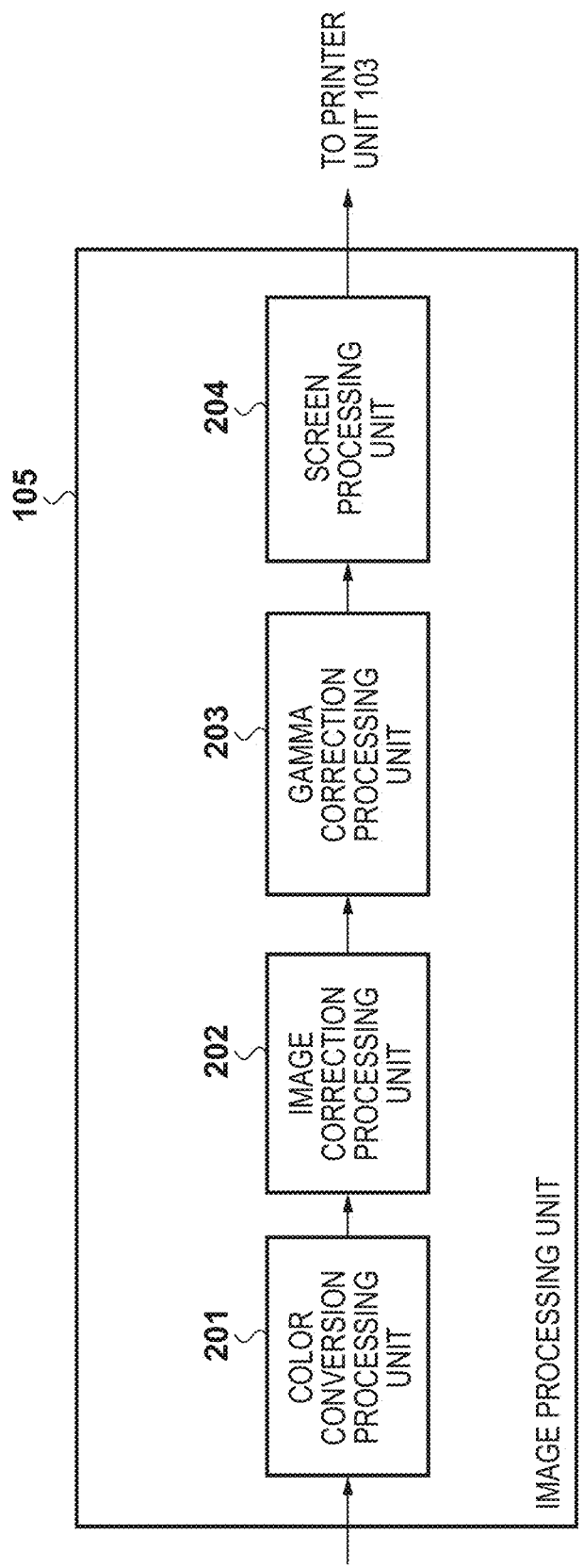
FIG. 2 is a block diagram showing an image processing unit 105 according to the embodiment.

The detail of the image processing unit 105 will be described next with reference to FIG. 2. As shown in FIG.

2, the image processing unit 105 includes a color conversion processing unit 201, an image correction processing unit 202, a gamma correction processing unit 203, and a screen processing unit 204. Note that as described above, the image processing unit 105 performs rasterization processing on the PDL data received by the host I/F unit 101, generating RGB multilevel image data. Printing image processing performed on the generated multilevel image data will be described in detail here.

The color conversion processing unit 201 performs color conversion processing from the RGB color space to the CMYK color space on the input multilevel image data (input image data). With this color conversion processing, CMYK image data having a multilevel density value (also referred to as a tone value or a signal value) of 8 bits (256 tones) per pixel is generated. This CMYK image data is stored in a buffer (not shown) in the color conversion processing unit 201. Note that here, the CPU 102 functions as an input unit and inputs image data received from the host computer 1 or the like to the image processing unit 105.

The image correction processing unit 202 executes fattening processing (image correction processing) to be described later on the input CMYK image data in order to correct the thickness of a character, a line, or the like in the image data.

The gamma correction processing unit 203 corrects input pixel data by using a one-dimensional lookup table such that a density characteristic when image data that has undergone screen processing by the screen processing unit 204 to be described later is transferred to a printing sheet becomes a desired characteristic. In this embodiment, a one-dimensional lookup table having a linear shape is used as an example. This lookup table outputs an input without any change. In accordance with a change in state of the print engine 22, however, the CPU 102 can also rewrite this one-dimensional lookup table. Pixel data after gamma correction is input to the screen processing unit 204.

The screen processing unit 204 performs screen processing on the input pixel data and outputs it to the engine I/F unit 106 as print data. A detail of the screen processing will be described later.

Screen Processing

The screen processing performed by the screen processing unit 204 in this embodiment will be described in detail next with reference to FIG. 3. The screen processing converts the image data of 8 bits (256 tones) per pixel into image data of 4 bits (16 tones) per pixel that can be processed by the print engine 22. In order to convert the image data into the 16-tone image data, a threshold matrix group including 15 threshold matrices is used for this conversion.

Note that each threshold matrix is obtained by arranging M×N thresholds in a matrix with a width M and a height N. The number of threshold matrices used for the screen processing is decided in accordance with the tone of image data to be output (for L bits (L is an integer equal to or larger than 2), a tone of 2 to the Lth power ($2^L$), and ($2^L-1$) is the number of matrices. Since L=4 bits here, the number of matrices is 15. The screen processing reads out a threshold corresponding to each pixel of the image data from each surface of the threshold matrices, and compares a pixel value with the threshold by the number of surfaces.

In the case of screen processing to 16 tones, the first level to the fifteenth level (Level 1 to Level 15) are set to the respective threshold matrices. Then, the screen processing unit 204 compares the pixel value with a corresponding threshold in each threshold matrix and outputs the largest value in the levels of a matrix having a threshold equal to or smaller than the pixel value. This output level value corresponds to a 4-bit tone value after the screen processing. With the above processing, the density value of each pixel of the image data is converted into a 4-bit value. The threshold matrices are applied repeatedly in a tiled pattern in a cycle of M pixels in a horizontal direction and N pixels in a vertical direction of the image data.

Figure 3:
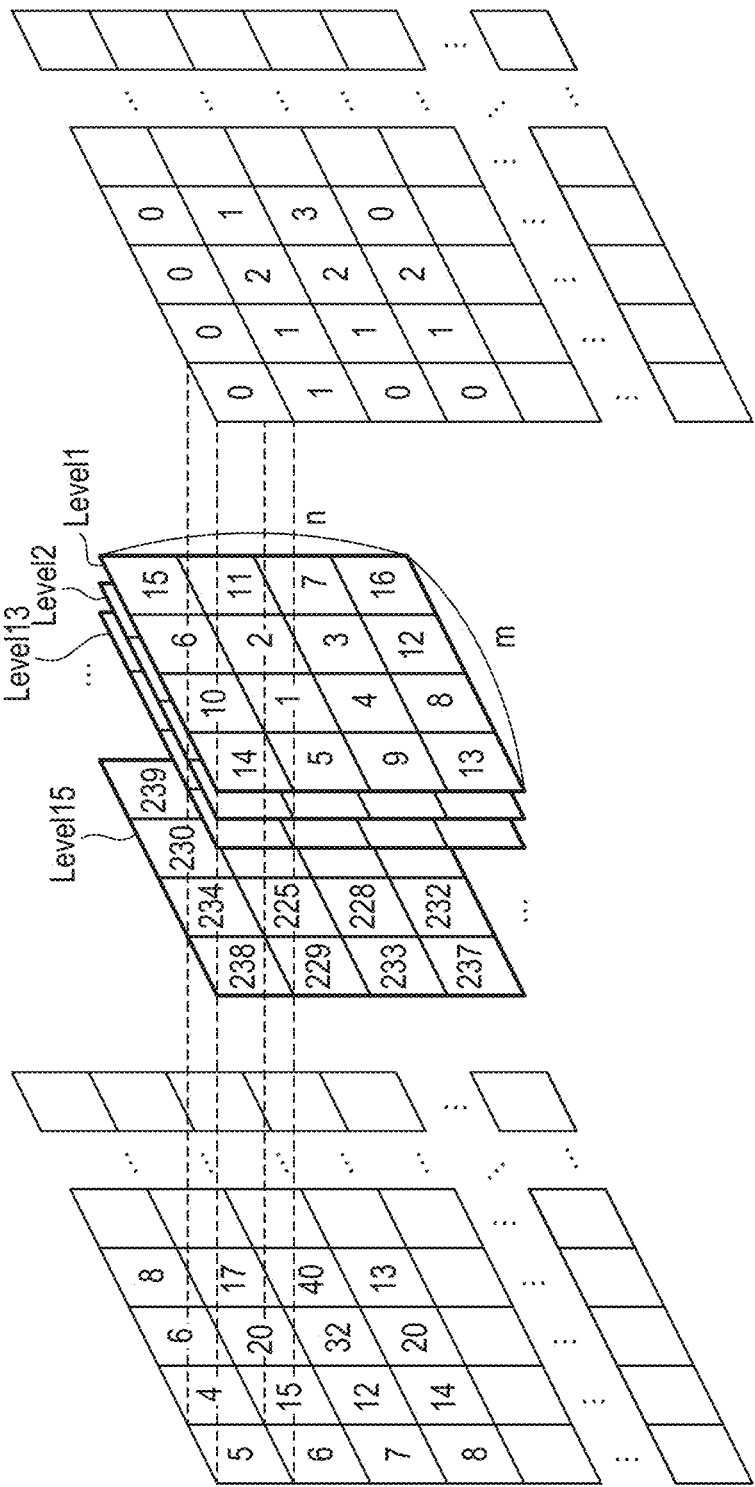
FIG. 3 is a view for explaining screen processing.

Note that the threshold matrices used by the screen processing unit 204 use threshold matrices as exemplarily shown in FIG. 3. Screen processing with respect to a pixel at the upper leftmost position of the image data in FIG. 3 will be described as a concrete example. The pixel value of the image data is 5. The threshold of the threshold matrix at Level 1 corresponding to this pixel is 14. The screen processing unit 204 compares the threshold 14 with the pixel value 5 and outputs 0 as an output because the threshold is larger. This output value "0" becomes screen data.

Processing Setting

Settings regarding processing of the image correction processing unit 202 will be described below with reference to FIG. 4. The operation unit 23 is a user interface for a touch screen and accepts instructions of processing settings in the image correction processing unit 202 from the user. For example, the operation unit 23 displays setting screens 400 and 410 as shown in FIG. 4, and accepts the settings of image correction processing by the image correction processing unit 202 from the user.

A method for setting information needed for the image correction processing will be described here. A description will be given here by limiting it to a case in which fattening is performed based on the information decided by the operation unit 23 as the image correction processing.

The setting contents of the operation unit 23 will be described below. First, thickness adjustment is set for each attribute. An attribute is an attribute for each pixel to be processed as shown on the setting screen 400 and indicates, for example, whether the pixel is a character, a line, a graphic, or an image. On the setting screen 400, as in a fattening setting 41, a button 42 of "none", "weak", and "strong" is displayed selectively. "None" indicates no correction, each of "weak" and "strong" indicates a degree to which the character is fattened in fattening processing, and "strong" is set to fatten the character more than "weak".

If an advanced setting button 43 is pressed on the setting screen 400, the setting screen 410 for designating a direction in which a thickness is to be adjusted is displayed on the operation unit 23. For example, a printing width may be different between a main scanning direction and a sub-scanning direction depending on a device characteristic, and thus selection can be made between a vertical direction and horizontal direction with respect to a sheet conveyance direction as in a correction direction 44 on the setting screen 410. In accordance with user inputs via these setting screens 400 and 410, information needed by the image correction processing unit 202 is set.

The operation unit 23 notifies the image correction processing unit 202 of this setting information as an image correction management table. FIG. 5 is an example of data saved in an image correction management table 500. This image correction management table 500 is saved in the RAM 103. The image correction processing unit 202 refers to attribute information of image data and replaces an attribute designated by the operation unit 23 with an undesignated attribute, correcting the thickness of the designated attribute. For example, if a pixel having the character attribute is designated as a pixel having a replacing attribute, the image correction processing unit 202 replaces a pixel having the background attribute which is not designated as the replacing attribute with the pixel having the character attribute, fattening a character.

The image correction management table 500 is information for controlling a replaced attribute and a replacing attribute. More specifically, the image correction management table 500 contains two pieces of information, namely, management information and attribute information. In the management information, a replacing attribute and a replaced attribute are defined. The replacing attribute indicates an attribute which corrects a thickness by replacement. The replaced attribute indicates an attribute which is replaced by the replacing attribute and has not undergone a fattening setting on the operation unit 23. In the example of FIG. 5, the character and line attributes are designated as replacing attributes, and the graphic, image, and background attributes are designated as replaced attributes.

Method for Generating Image Correction Management Table

Subsequently, a concrete method for generating the image correction management table will be described. If the setting screen 400 sets the fattening setting of an attribute "character" to "weak" or "strong", image correction processing is performed on an object having the character attribute. At this time, the operation unit 23 adds the character attribute to the replacing attribute of the image correction management table 500 and updates the table. Note that the CPU 102 may execute update of the image correction management table 500 based on information accepted by the operation unit 23. On the other hand, if the setting screen 400 sets the fattening setting of the attribute "character" to "none", the image correction processing is not performed on the object having the character attribute. At this time, the operation unit 23 adds the character attribute to the replaced attribute of the image correction management table 500.

If the setting screen 400 sets the fattening setting to "weak" or "strong" in the same manner with respect to the line, graphic, and image attributes, the image correction processing is performed on objects having these attributes. At this time, the operation unit 23 adds these attributes to the replacing attribute of the image correction management table 500. On the other hand, if the setting screen 400 sets the fattening setting to "none", the image correction processing is not performed on the objects having these attributes. At this time, the operation unit 23 adds these attributes to the replaced attribute of the image correction management table 500.

Since the background attribute is fattened from either attribute, the CPU 102 adds the background attribute to the replaced attribute of the image correction management table 500 regardless of a setting. For example, if the fattening setting is performed on all the attributes, all the set attributes are fattened as the background attributes.

In this embodiment, a case in which a setting is performed as on the setting screen 400 (character: weak, line: weak, graphic: none, and image: none) will be described. Then, as for the advanced setting of the setting screen 410, a case will be described in which only the horizontal direction is designated for the correction direction. At this time, as shown in FIG. 5, at least one of the character attribute and the line attribute is designated as the replacing attribute (second attribute) of the image correction management table 500. At least one of the graphic, image, and background is designated as the replaced attribute (first attribute).

Image Correction Processing

Image correction processing by the image correction processing unit 202 will be described next with reference to FIGS. 6 to 9C. FIG. 8 is a view for explaining the positional relationship of pixels used by the image correction processing unit 202.

In this embodiment, as shown in FIG. 8, image data of three pixels, namely, a pixel 801, a pixel 802, and a pixel 803 and corresponding attribute data are input from the color conversion processing unit 201 to the image correction processing unit 202. In this three-pixel image data and attribute data, the pixel 801 is arranged as a pixel of interest, and the pixel 802 is arranged as a reference pixel adjacent to the pixel of interest. Then, the pixel 803 is arranged as a pixel adjacent to the pixel of interest in an opposite direction to the reference pixel (opposite pixel). The pixel of interest is a pixel to undergo the image correction processing in the image correction processing unit 202, that is, a pixel having the replaced attribute. The reference pixel is a pixel to be referred to in order to determine whether the image correction processing is applied to the pixel of interest. The opposite pixel is arranged in the opposite direction to the reference pixel with reference to the pixel of interest and is referred to in order to determine whether the image correction processing is applied to the pixel of interest.

Figure 6:
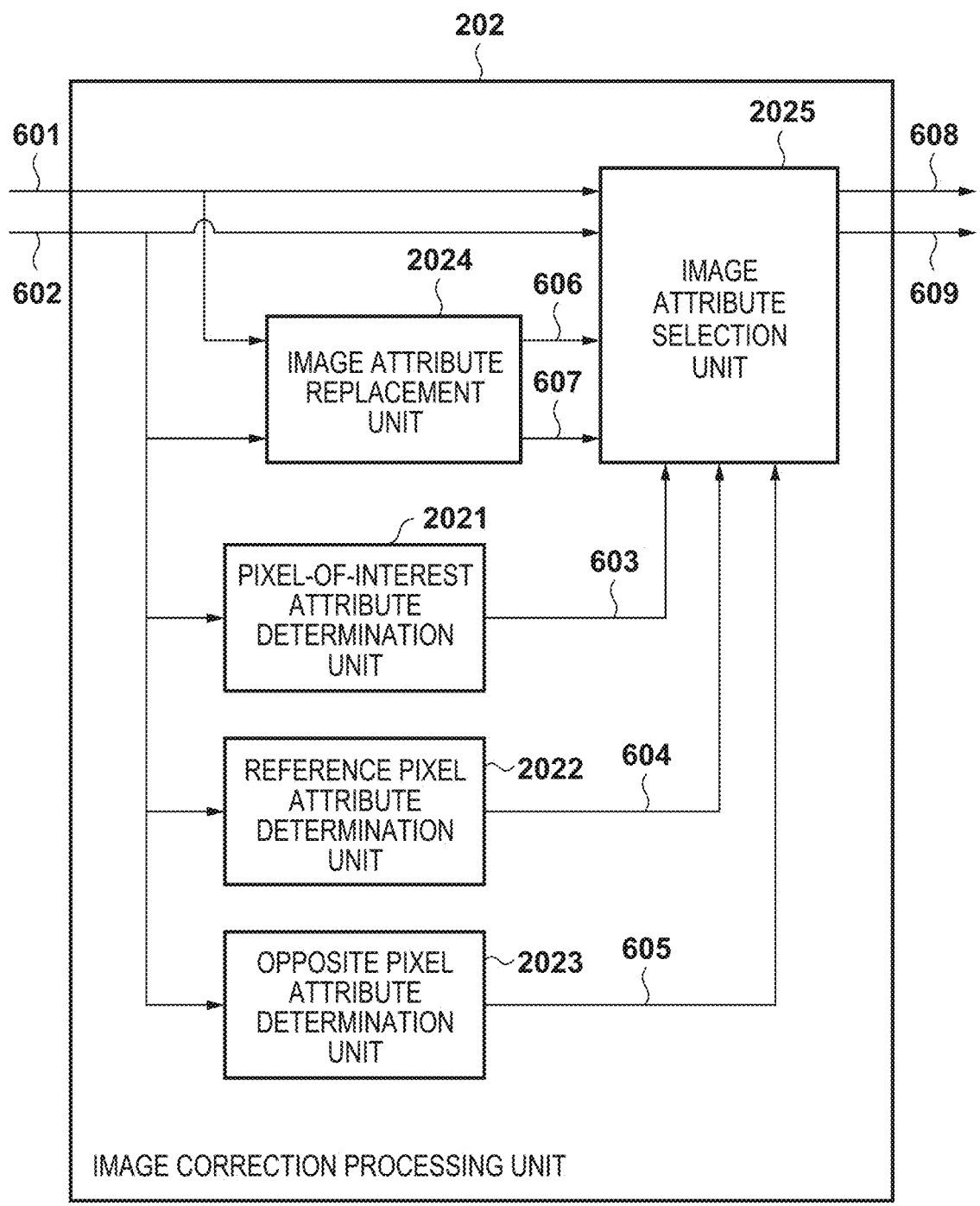
FIG. 6 is a block diagram showing an image correction processing unit 202 according to the embodiment.

The outline of the image correction processing will be described. Note that FIG. 6 shows a detail of the image correction processing unit 202 of this embodiment. The image correction processing unit 202 inputs image data 601 and attribute data 602 indicating the attribute of the image data 601, and outputs image data 608 and attribute data 609 after correction, respectively.

First, the overall operation of the image correction processing unit 202 will be described. The notification of the image correction management table 500 is made from the operation unit 23, and the replacing attribute and the replaced attribute are set in the image correction processing unit 202. (1) A pixel-of-interest attribute determination unit 2021 determines whether the attribute of the pixel of interest included in the image data is the replacing attribute or the replaced attribute. (2) A reference pixel attribute determination unit 2022 determines whether the attribute of the reference pixel included in the image data is the replacing attribute or the replaced attribute. (3) An opposite pixel attribute determination unit 2023 determines whether the attribute of the opposite pixel included in the image data is the same as that of the reference pixel. (4) An image attribute replacement unit 2024 replaces the pixel value and attribute of the pixel of interest by using the pixel value and attribute of the reference pixel. (5) Based on the determination results of (1) to (3) described above, an image attribute selection unit 2025 outputs the image data 608 and the attribute data 609 obtained by correcting the image data 601 and the attribute data 602 to the gamma correction processing unit 203. Note that as a process of replacing the pixel value and attribute of the pixel of interest by using the pixel value and attribute of the reference pixel described above, for example, there is a process of setting the same pixel value and attribute as the pixel value and attribute of the reference pixel as the pixel value and attribute of the pixel of interest. Alternatively, the replacement processing may be a process of setting a pixel value and attribute similar to the pixel value and attribute of the reference pixel as the pixel value and attribute of the pixel of interest.

The detailed operation of each processing unit that forms the image correction processing unit 202 will be described next. The pixel-of-interest attribute determination unit 2021 refers to the attribute data 602 in the pixel of interest and determines the attribute of the pixel of interest. If the attribute of the pixel of interest is one of the attributes defined as the replaced attributes, the pixel-of-interest attribute determination unit 2021 sets information indicating that the attribute of the pixel of interest matches the replaced attribute to a flag 603 and outputs it to the image attribute selection unit 2025. The reference pixel attribute determination unit 2022 refers to the attribute data 602 in the reference pixel and determines the attribute of the reference pixel. If the attribute of the reference pixel is the replacing attribute, the reference pixel attribute determination unit 2022 sets information indicating that the attribute of the reference pixel matches the replacing attribute to a flag 604 and outputs it to the image attribute selection unit 2025. The opposite pixel attribute determination unit 2023 refers to the attribute data 602 in the opposite pixel and determines the attribute of the opposite pixel. The opposite pixel attribute determination unit 2023 determines whether the attribute of the opposite pixel is the same as the attribute of the reference pixel, sets information indicating that the attribute of the opposite pixel matches the same attribute as the reference pixel to a flag 605, and outputs it to the image attribute selection unit 2025. The image attribute replacement unit 2024 performs a process of replacing the pixel value and attribute data of the pixel of interest by using the image data 601 and the attribute data 602 in the reference pixel. Then, the image attribute replacement unit 2024 outputs image data 606 and attribute data 607 as a result of replacement to the image attribute selection unit 2025.

The flags 603, 604, and 605, the image data 601 and 606 in the pixel of interest, and the attribute data 602 and 607 are input to the image attribute selection unit 2025. Based on these inputs, the image attribute selection unit 2025 outputs the image data 608 and the attribute data 609 in the pixel of interest to the gamma correction processing unit 203. This output operation will be described by using a flowchart in FIG. 7 and explanatory views in FIGS. 9A-9C.

Figure 7:
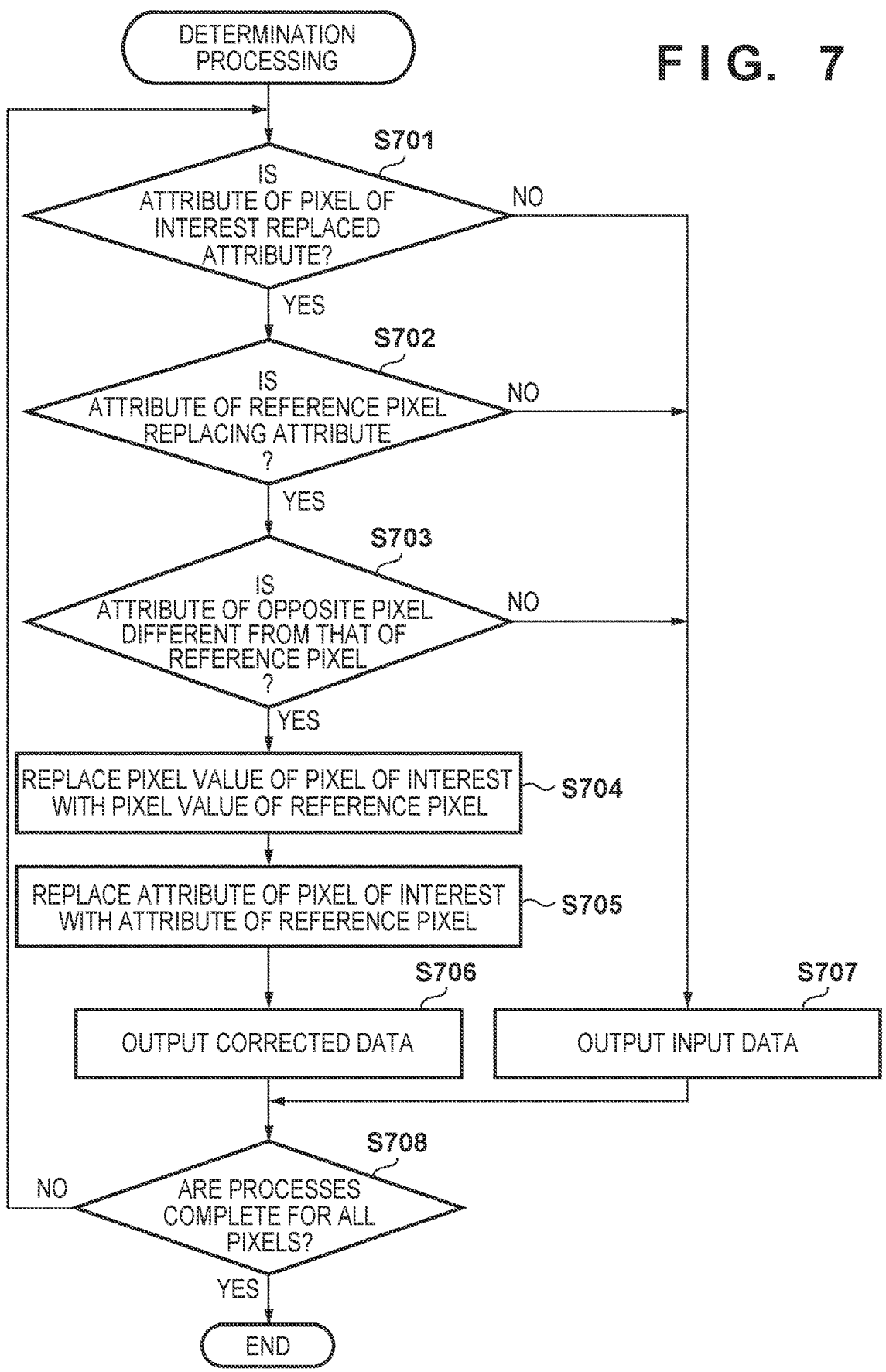
FIG. 7 is a flowchart of the image correction processing according to the embodiment.
Figure 8:
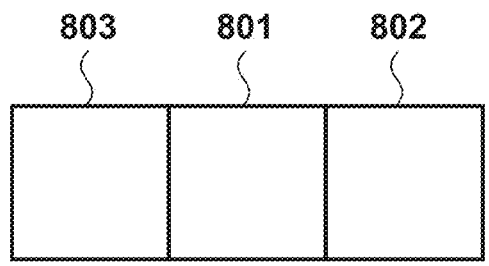
FIG. 8 is a view for explaining the image correction processing according to the embodiment.
Figure 9A:
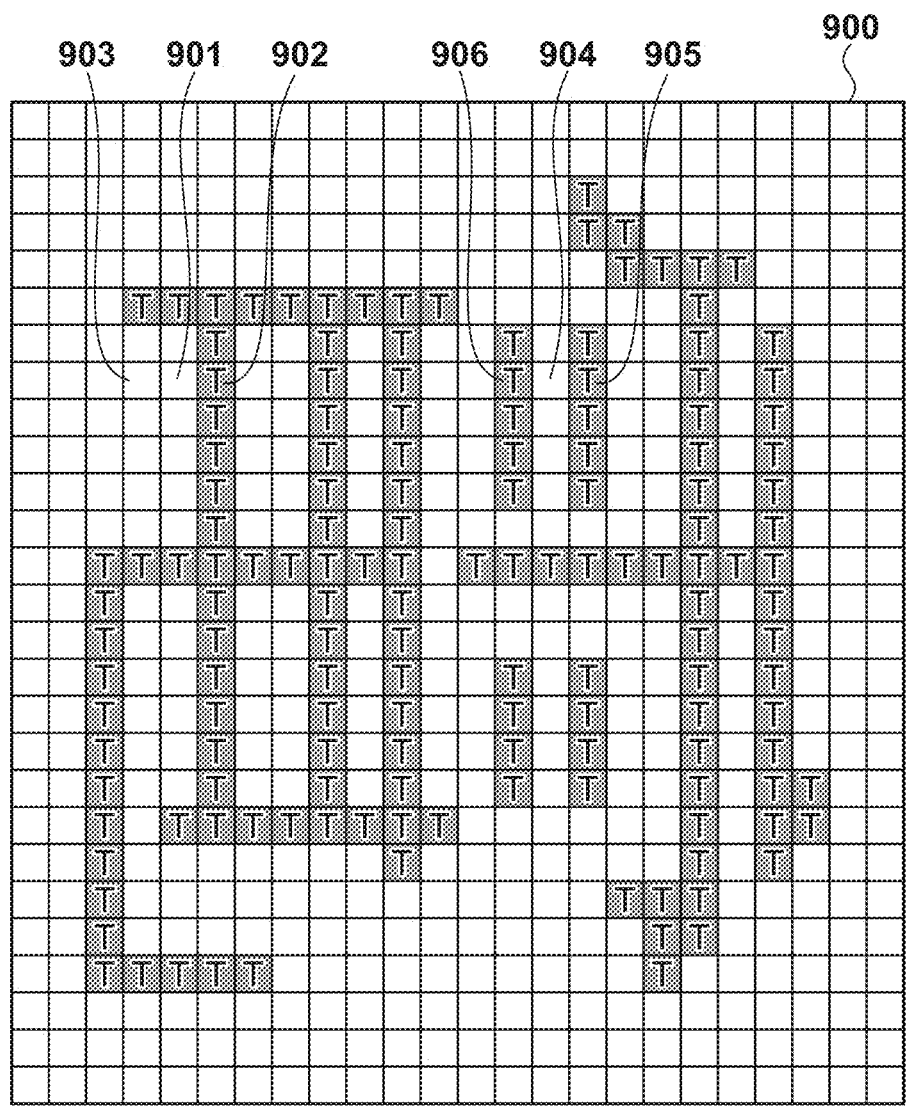
FIGS. 9A-9C show views for explaining the image correction processing according to the embodiment.
Figure 9B:
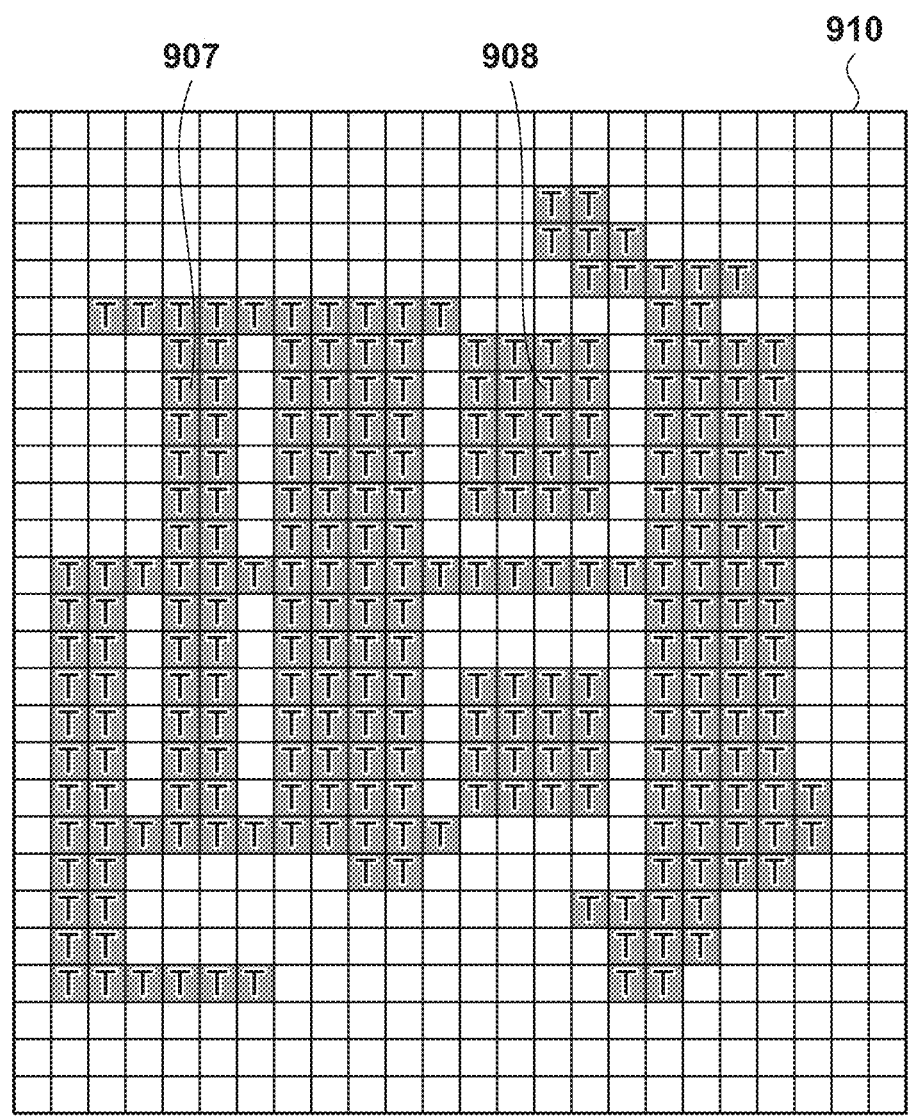
Figure 9C:
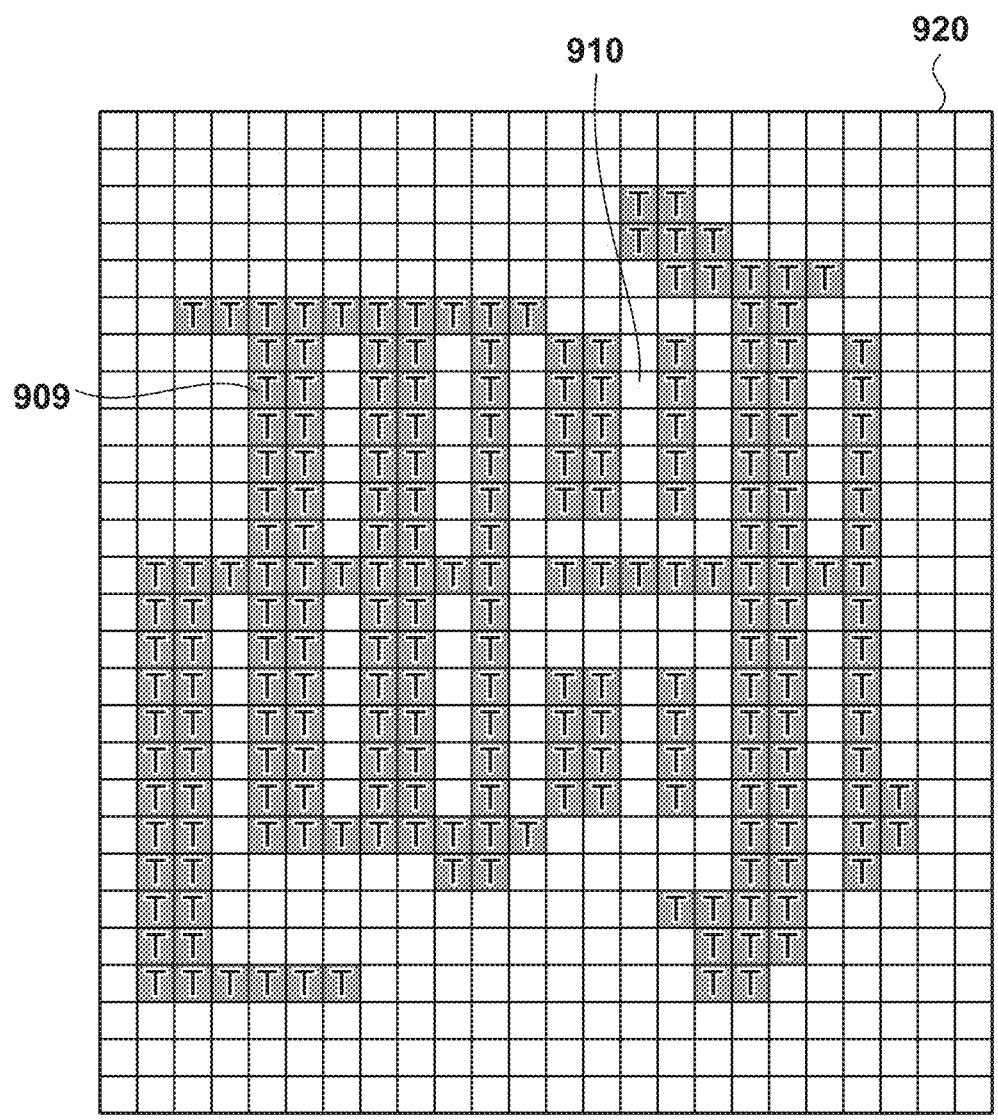

FIG. 7 shows the processing sequence of image correction processing performed by the image correction processing unit 202. Note that processes to be described below are executed by the image correction processing unit 202 under an instruction by the CPU 102. More specifically, these processes are implemented by, for example, causing the CPU 102 to load programs stored in the ROM 104 into the RAM 103 and execute them. FIGS. 9A-9C show the views for explaining the image processing performed by the image correction processing unit 202 in this embodiment in detail. In FIGS. 9A-9C, white pixels indicate pixels each having a background attribute, and black pixels indicate pixels each having a character attribute (the expression of "T" in FIGS. 9A-9C).

An image 900 is an attribute image input to the image correction processing unit 202. An image 910 is a processing result in a case (conventional method) in which the image correction processing is performed with reference to only a pixel of interest and a reference pixel. An image 920 is a processing result in a case in which the image correction processing in this embodiment is performed. A description will be given here by taking, as an example, a case in which the CPU 102 notifies the image correction processing unit 202 that the replacing attributes are the character and the line, and the replaced attributes are the image, the graphic, and the background. A description will be given below by paying attention to a pixel 901 and a pixel 904.

In step S701, the image attribute selection unit 2025 refers to the flag 603. If the flag 603 indicates that the attribute of the pixel of interest matches the replaced attribute (YES in step S701), the process advances to step S702; otherwise (NO in step S701), the process advances to step S707. For example, when the pixel of interest is the pixel 901, the pixel of interest has the background attribute which is determined to match the replaced attribute in a determination in step S701, and thus the process advances to step S702. Likewise, when the pixel of interest is the pixel 904, the pixel of interest has the background attribute, and thus the process advances to step S702. The image correction processing is processing for fattening a target attribute image by replacing the reference pixel with the pixel value similar to that of the pixel of interest and the same attribute as that of the pixel of interest. Therefore, it is determined in step S701 whether the pixel of interest is a pixel having the replaced attribute as the replacement target.

In step S702, the image attribute selection unit 2025 refers to the flag 604. If the flag 604 indicates that the attribute of the reference pixel matches the replacing attribute (YES in step S702), the process advances to step S703; otherwise (NO in step S702), the process advances to step S707. For example, when the pixel of interest is the pixel 901, the reference pixel is a pixel 902 adjacent to the pixel 901. The pixel 902 has the character attribute which is determined in step S702 to match the replacing attribute, and thus the process advances to step S703. Likewise, when the pixel of interest is the pixel 904, the reference pixel is a pixel 905. The pixel 905 has the character attribute, and thus the process advances to step S703.

In step S703, the image attribute selection unit 2025 refers to the flag 605. If the flag 605 indicates that the attribute of the opposite pixel is different from that of the reference pixel (YES in step S703), the process advances to step S704; otherwise (NO in step S703), the process advances to step S707. For example, when the pixel of interest is the pixel 901, the opposite pixel is a pixel 903. The pixel 903 has the background attribute which is determined in step S703 to be different from the character attribute of the pixel 902 of the reference pixel, and thus the process advances to step S704. After that, replacement processing is performed in steps S704 and S705. Likewise, when the pixel of interest is the pixel 904, the opposite pixel is a pixel 906. The pixel 906 has the character attribute which is determined in step S703 to match the character attribute of the pixel 905 of the reference pixel, and thus the process advances to step S707.

Note that as a comparative example, when image correction processing is performed with reference to only a pixel of interest and a reference pixel, a determination in step S703 is not performed, a pixel 904 is replaced with a pixel 905, and a pixel 908 is obtained as a result of replacing the pixel 904 with the attribute of the pixel 905. An image 910 shows a result as this comparative example. As shown in the image 910, it is found that a vertical bar having the character attribute that includes the pixel 905 is fattened by one pixel leftward and joins a vertical bar having the character attribute that includes a pixel 906, causing a collapse.

In this embodiment, it is determined in step S703 that the opposite pixel is different from the reference pixel. This determines that the same attributes as the reference pixel, the pixel of interest, and the opposite pixel do not continue even if the pixel of interest is replaced with the reference pixel by determining that the attribute of the reference pixel is different from that of the opposite pixel. Then, it is determined in step S703 that the pixel 906 of the opposite pixel and the pixel 905 of the reference pixel have the same character attribute, and thus a collapse occurs if the image correction processing is performed. Therefore, not a replacement result but input data is output.

In step S704, the image attribute replacement unit 2024 replaces the pixel value of the pixel of interest with the pixel value of the reference pixel. Subsequently, in step S705, the image attribute replacement unit 2024 replaces the attribute of the pixel of interest with the attribute of the reference pixel. In step S706, the image attribute selection unit 2025 outputs, to the gamma correction processing unit 203, the image data 606 and the attribute data 607 as the image data 608 and the attribute data 609 in the pixel of interest, and the process advances to step S708. Note that the image data 606 is image data in the pixel of interest corrected by the image attribute replacement unit 2024. The attribute data 609 is attribute data in the pixel of interest corrected by the image attribute replacement unit 2024.

On the other hand, in step S707, the image attribute selection unit 2025 outputs, to the gamma correction processing unit 203, the image data 601 and the attribute data 602 as the image data 608 and the attribute data 609 in the pixel of interest, and the process advances to step S708. In step S708, the image correction processing unit 202 determines whether the processes are performed on all the pixels. If the processes are not complete for all the pixels, the process returns to step S701. That is, it is determined here whether the processes from step S701 to step S708 are executed by setting all the pixels as pixels of interest. If the processes are complete for all the pixels, this processing ends.

As described above, the image processing apparatus according to this embodiment sets one pixel of input image data as a pixel of interest in turn and selects whether or not to execute image processing on the pixel of interest based on at least the attributes of the pixel of interest, a reference pixel, and an opposite pixel. Note that the reference pixel is a pixel adjacent to the pixel of interest in one direction, and the opposite pixel is a pixel adjacent to the pixel of interest in an opposite direction to the one direction. More specifically, this image processing apparatus selects image data corrected as image data of the pixel of interest as long as the pixel of interest has the first attribute to be corrected, the reference pixel has the second attribute not to be corrected, and the reference pixel is different from the opposite pixel in attribute. On the other hand, if it is not so, the image processing apparatus selects image data input as the image data of the pixel of interest. Thus, according to this embodiment, it becomes possible to perform image correction processing while minimizing a decrease in character visibility without performing image correction on a portion such as the image 910 in which character visibility decreases when fattened with reference to a pixel in the opposite direction to the reference pixel. In this embodiment, the case has been described in which the pixel is fattened by one pixel leftward with respect to the pixel of interest. However, the pixel may be fattened in another direction, as a matter of course. The pixel may be fattened by one pixel, for example, upward or rightward. If an upper pixel with respect to the pixel of interest is the reference pixel, a lower pixel is the opposite pixel.

The present invention is not limited to the above-described embodiment, and various modifications are possible. For example, in the above embodiment, the arrangement has been described in which the image attribute selection unit 2025 selects and outputs image data on which image processing is executed in the image attribute replacement unit 2024 with respect to all the input data and image data on which the image processing is not executed. This implements an arrangement for selecting whether or not to execute the image processing in the above-described embodiment. However, the arrangement for selecting whether or not to execute the image processing may be implemented by executing the image processing by the image attribute replacement unit 2024 only on selected input data out of the input data. In this case, the image attribute replacement unit 2024 and the image attribute selection unit 2025 are integrated with each other to form a single unit, and determination results of the respective determination units 2021, 2022, and 2023 are output to the unit. The unit executes image processing (replacement processing) only on the selected input data out of the input data and outputs resultant data, and does not execute the image processing on input data other than this and outputs data without any change. Note that such modifications are also applicable to the second embodiment and third embodiment to be described below.

In this embodiment, processing for the images that include the pixels each having the background attribute and the pixels each having the character attribute has been given as an example. However, an image may be used in which pixels each having a background attribute and pixels each having a character attribute, and pixels each having an image attribute coexist. When a plurality of attributes coexist, processing may be performed by giving a priority order. For example, the character attributes have higher priority than the image attributes. This is because the pixels each having the image attribute often form a photo or the like and are often formed by a plurality of pixels. Many strokes exist for one-pixel width in a character small in point, and thus there is a high demand for fattening it preferentially.

For example, three pixels each having the character attribute, the background attribute, and the image attribute are aligned in sequence, the pixel having the character attribute takes priority over the pixel having the background attribute in fattening. At this time, the pixel having the background attribute is fattened by the pixel having the character attribute, eliminating the pixel having the background attribute. However, this poses no problem because a decrease in character visibility owing to a collapse by fattening processing is caused by fattening and collapsing adjacent strokes of a character.

Second Embodiment

Image processing according to the second embodiment of the present invention will be described below. In the first embodiment, the case has been described in which the fattening setting 41 is "weak", and the pixel is fattened by one pixel. In the second embodiment, a case will be described in which a fattening setting 41 is "strong", and a pixel is fattened by one pixel each of leftward and rightward. Note that only a difference from the first embodiment will be described in detail below. That is, selection between "weak" and "strong" sets a pixel range of fattening processing. The pixel range includes one pixel for "weak" and two pixels for "strong". Note that the present invention is not limited to this and can also designate the pixel range equal to or larger than three pixels.

Image Correction Processing

Image correction processing by an image correction processing unit 202 in the second embodiment will be described. First, the positional relationship of pixels used by the image correction processing unit 202 will be described with reference to FIG. 11.

Figure 11:
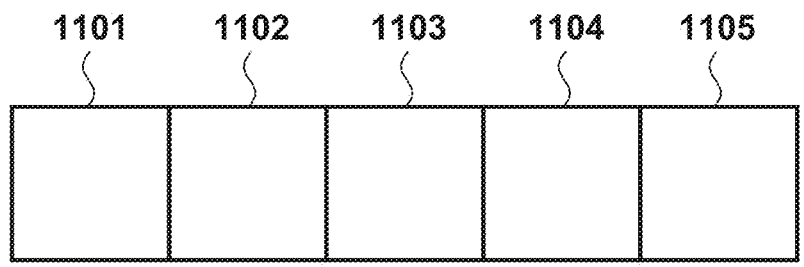
FIG. 11 is a view for explaining the image correction processing according to the embodiment.

According to this embodiment, as shown in FIG. 11, image data of five pixels, namely, a pixel 1101, a pixel 1102, a pixel 1103, a pixel 1104, and a pixel 1105 and corresponding attribute data are input from a color conversion processing unit 201 to the image correction processing unit 202. A pixel of interest to be a target of the image correction processing is arranged in the pixel 1103 which is the center of five pixels.

In this embodiment, the pixel is fattened by one pixel for each of leftward and rightward, and thus the directions (ref_dir) of reference pixels with respect to the pixel of interest are two directions of the left and right. With respect to the pixel 1103 of the pixel of interest, the direction of the pixel 1102 is ref_dir=1. Then, with respect to the pixel 1103 of the pixel of interest, the direction of the pixel 1104 is ref_dir=2. Then, pixels adjacent to the reference pixels in opposite directions to the pixel of interest (opposite pixels) exist for the respective reference pixels.

The opposite pixels to the pixel 1104 of the reference pixel are two pixels, namely, the pixel 1102 and the pixel 1101. There are two opposite pixels because there are two reference pixels, namely, the pixel 1102 and the pixel 1104. For example, when two pixels each having the background attribute in a horizontal direction are sandwiched by two pixels each having the character attribute in the horizontal direction, the pixels each having the character attribute adjacent to the pixels each having the background attribute become the reference pixels, respectively. At this time, the pixels each having the character attribute are fattened to the pixels each having the background attribute, collapsing and eliminating the pixels each having the background attribute. Therefore, a collapse does not occur if two pixels in the opposite direction to the reference pixel are different from the reference pixel in attribute. The opposite pixels to the pixel 1102 of the reference pixel are two pixels, namely, the pixel 1104 and the pixel 1105. Note that distances (re_dis) of the respective opposite pixels from the pixel of interest are 1 for the pixel 1102 and 2 for the pixel 1101.

A detailed operation of each processing unit that forms the image correction processing unit 202 will be described next. Flags 603, 604, and 605, image data 601 and 606 in the pixel of interest, and attribute data 602 and 607 are input to an image attribute selection unit 2025. Based on these inputs, the image attribute selection unit 2025 outputs image data 608 and attribute data 609 in the pixel of interest to a gamma correction processing unit 203. This output operation will be described with reference to a flowchart in FIG. 10 and FIGS. 12A-12C.

Figure 12A:
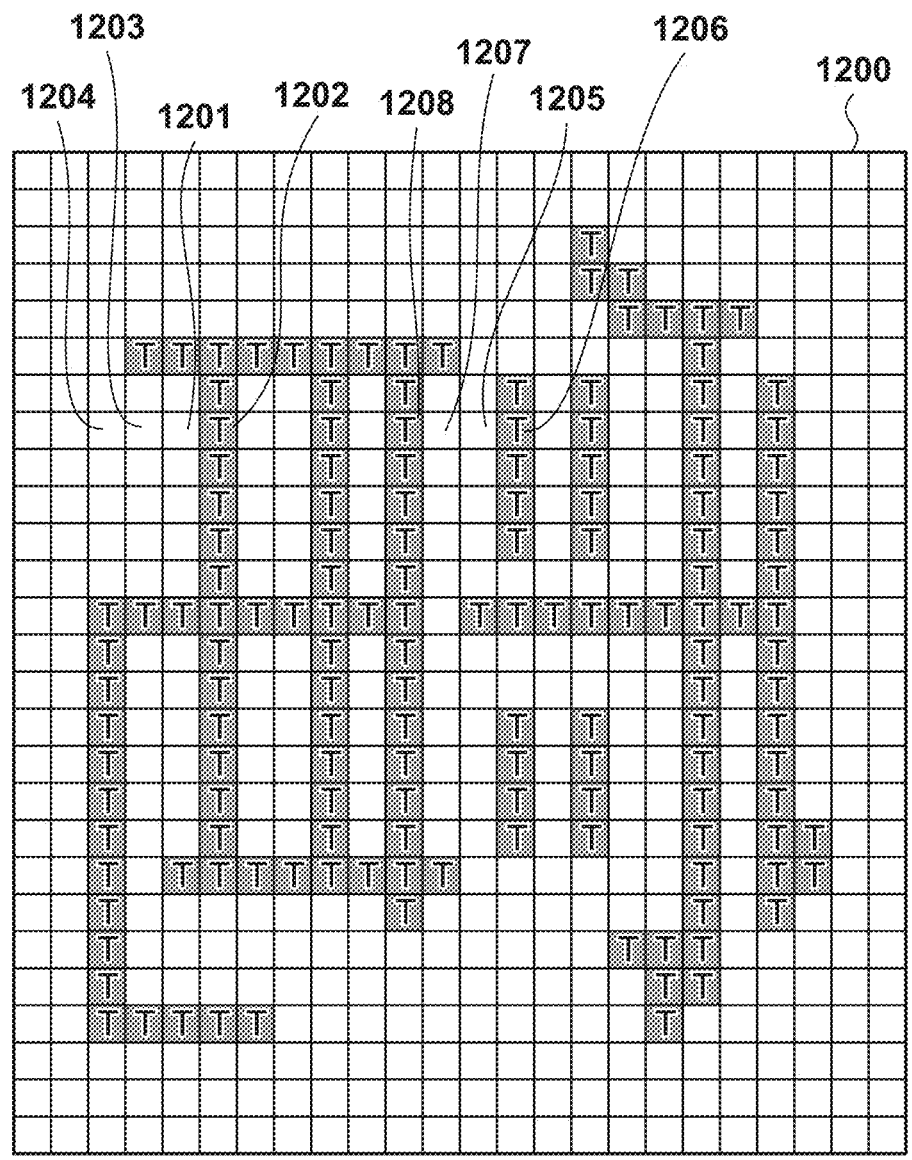
FIGS. 12A-12C show views for explaining the image correction processing according to the embodiment.
Figure 12B:
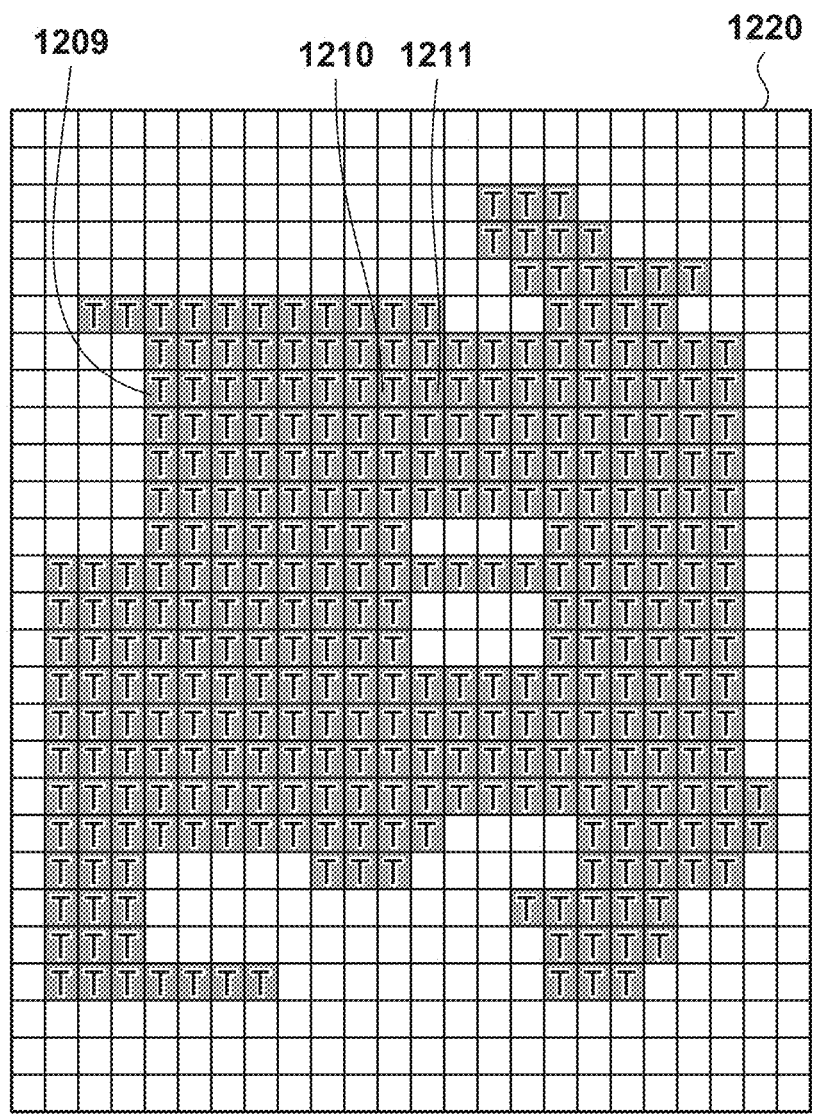
Figure 12C:
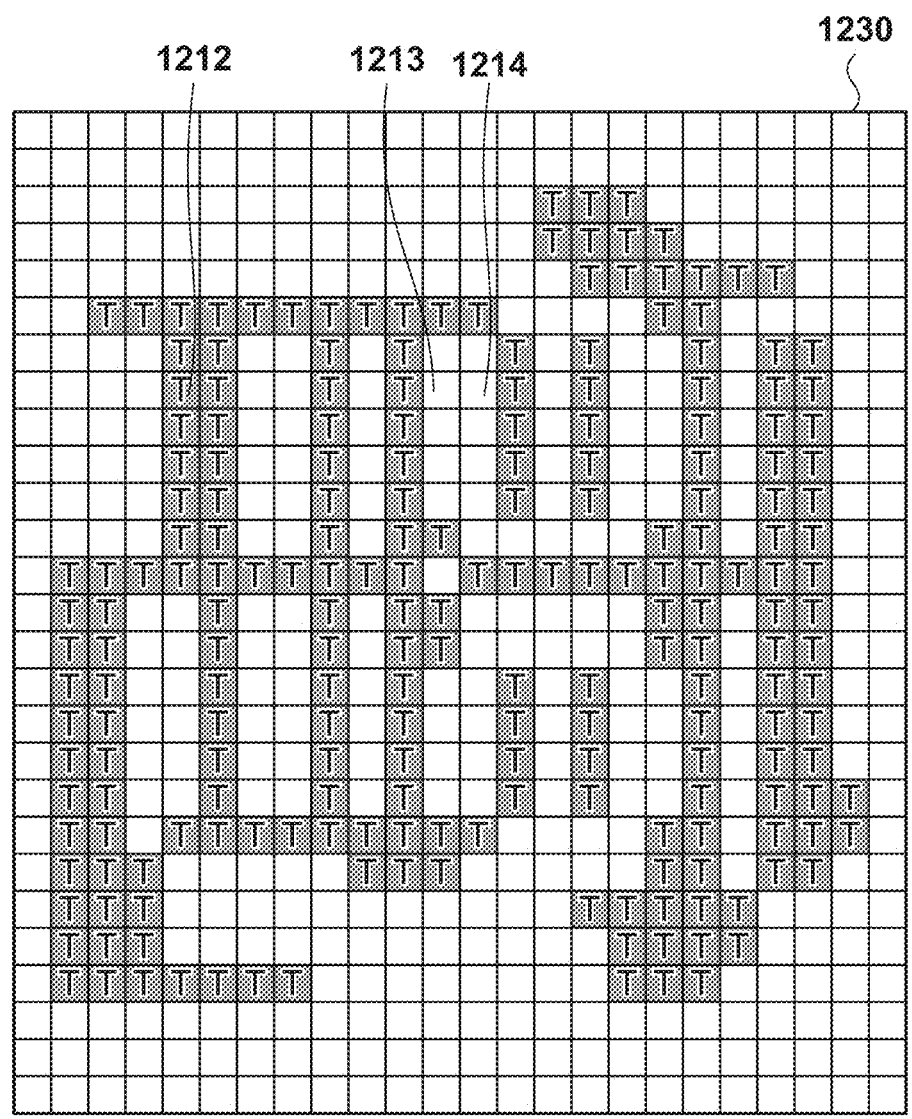

FIG. 10 shows the flowchart of image correction processing performed by the image correction processing unit 202. Processes to be described below are executed by the image correction processing unit 202 under an instruction by a CPU 102. More specifically, these processes are implemented by, for example, causing the CPU 102 to load programs stored in a ROM 104 into a RAM 103 and execute them. FIGS. 12A-12C show the views for explaining the image processing performed by the image correction processing unit 202 in this embodiment in detail. In FIGS. 12A-12C, white pixels indicate pixels each having a background attribute, and black pixels indicate pixels each having a character attribute (the expression of "T" in FIGS. 12A-12C). An image 1200 is an attribute image input to the image correction processing unit 202. As a comparative example, an image 1220 is a processing result in a case in which image correction processing is performed with reference to only a pixel of interest and a reference pixel. An image 1230 is a processing result in a case in which the image correction processing in this embodiment is performed. A description will be given here by taking, as an example, a case in which the CPU 102 notifies the image correction processing unit 202 that replacing attributes are a character and a line, and replaced attributes are an image, a graphic, and a background.

In step S1001, the image correction processing unit 202 sets an initial value of each parameter. That is, the image correction processing unit 202 sets 1 to ref_dir and re_dis. In step S1002, the image attribute selection unit 2025 refers to the flag 603. If the flag 603 indicates that the attribute of the pixel of interest matches the replaced attribute (YES in step S1002), the process advances to step S1003; otherwise (NO in step S1002), the process advances to step S1012.

If the pixel of interest does not have the replaced attribute, it is not the target of correction processing, and thus the process advances to step S1012 in which input data is output. On the other hand, when the pixel of interest is a pixel 1201, the pixel of interest has the background attribute which matches the replaced attribute in step S1002, and thus the process advances to step S1003. Likewise, when the pixel of interest is a pixel 1205, the pixel of interest has the background attribute, and thus the process advances to step S1003.

In steps S1003 to S1005, it is determined whether the attributes of all the reference pixels match the replacing attributes. In step S1003, the image attribute selection unit 2025 refers to the flag 604. If the flag 604 indicates that the attribute of each reference pixel matches the replacing attribute (YES in step S1003), the process advances to step S1006; otherwise (NO in step S1003), the process advances to step S1004.

In step S1004, the image attribute selection unit 2025 determines whether all reference directions are referred to. In this embodiment, the maximum value of ref_dir is 2, and it is thus determined whether ref_dir is 2. If ref_dir is 2 (YES in step S1004), the process advances to step S1012; otherwise (NO in step S1004), the process advances to step S1005. In step S1005, the image correction processing unit 202 adds 1 to ref_dir in order to change the direction of each reference pixel, and then the process returns to step S1003.

For example, when the pixel of interest is the pixel 1201, ref_dir is 1, and thus the reference pixel is a pixel 1203. The pixel 1203 has the background attribute which does not match the replacing attribute in step S1003, and thus the process advances to step S1004. Since ref_dir is 1 in step S1004, the process advances to step S1005 in order to refer to the next reference pixel. In step S1005, the image correction processing unit 202 adds 1 to ref_dir, and the process returns to step S1003. Since ref_dir is 2, the reference pixel is a pixel 1202. The pixel 1202 has the character attribute which matches the replacing attribute in step S1003, and thus the process advances to step S1006.

Likewise, when the pixel of interest is the pixel 1205, ref_dir is 1, and thus the reference pixel is a pixel 1207. The pixel 1207 has the background attribute which does not match the replacing attribute in step S1003, and thus the process advances to step S1004. Since ref_dir is 1 in step S1004, the process advances to step S1005 in order to refer to the next reference pixel. In step S1005, the image correction processing unit 202 adds 1 to ref_dir, and the process returns to step S1003. Since ref_dir is 2, the reference pixel is a pixel 1206. The pixel 1206 has the character attribute which matches the replacing attribute in step S1003, and thus the process advances to step S1006.

In steps S1006 to S1008, it is determined whether the attributes of all the opposite pixels match the attributes of the reference pixels. In step S1006, the image attribute selection unit 2025 refers to the flag 605. If the flag 605 indicates that the attribute of each opposite pixel matches that of a corresponding one of the reference pixels (YES in step S1006), the process returns to step S1004; otherwise (NO in step S1006), the process advances to step S1007.

In step S1007, the image correction processing unit 202 determines whether all the opposite pixels are referred to. In this embodiment, there are two opposite pixels, and thus the image correction processing unit 202 determines whether re_dis is 2. If re_dis is 2, the image correction processing unit 202 determines that processes are performed on all the opposite pixels, and the process advances to step S1009. If re_dis is 1, the image correction processing unit 202 determines that the processes are not performed on all the opposite pixels, and the process advances to step S1008. In step S1008, the image correction processing unit 202 adds 1 to re_dis in order to change the opposite pixel to be referred to, and the process returns to step S1006 in which it is determined whether the attribute of the changed opposite pixel matches that of the reference pixel.

For example, when the pixel of interest is the pixel 1201, and the reference pixel is the pixel 1202, the opposite pixels are the pixel 1203 and a pixel 1204. Note that re_dis is 1, and thus the opposite pixel is the pixel 1203. In step S1006, the attribute of the pixel 1203 of the opposite pixel is the background attribute which is different from the character attribute of the pixel 1202 of the reference pixel, and thus the process advances to step S1007. Since re_dis is 1 in step S1007, the process advances to step S1008 in order to refer to the next opposite pixel. In step S1008, 1 is added to re_dis to obtain 2. Then, since re_dis is 2 in step S1006, the opposite pixel is the pixel 1204. The attribute of the pixel 1204 of the opposite pixel is the background attribute which is different from the character attribute of the pixel 1202 of the reference pixel, and thus the process advances to step S1007. Since re_dis is 2 in step S1007, the process advances to step S1009. When the pixel of interest is the pixel 1201, and the reference pixel is the pixel 1202, both the opposite pixels have attributes different from the attribute of the reference pixel. Thus, the pixel 1201 of the pixel of interest is determined to be the target of correction processing, and the correction processing is applied in steps S1009 to S1011.

Subsequently, when the pixel of interest is the pixel 1205, and the reference pixel is the pixel 1206, the opposite pixels are the pixel 1207 and a pixel 1208. Note that re_dis is 1, and thus the opposite pixel is the pixel 1207. In step S1006, the attribute of the pixel 1207 of the opposite pixel is the background attribute which is different from the character attribute of the pixel 1206 of the reference pixel, and thus the process advances to step S1007. Since re_dis is 1 in step S1007, the process advances to step S1008 in order to refer to the next opposite pixel. In step S1008, 1 is added to re_dis to obtain 2. Then, since re_dis is 2 in step S1006, the opposite pixel is the pixel 1208. The attribute of the pixel 1208 of the opposite pixel is the character attribute which matches the character attribute of the pixel 1206 of the reference pixel, and thus the process returns to step S1004. Furthermore, since ref_dir is also 2, the process advances to step S1012.

When the pixel of the interest is the pixel 1205, and the reference pixel is the pixel 1206, one of the opposite pixels has the same attribute as the reference pixel, and it is thus determined that the pixel 1201 of the pixel of interest is not the target of the correction processing. In step S1012, the input data is output as output data. Then, a processing result is a pixel 1214.

A case in which image correction processing is performed with reference to only a pixel of interest and a reference pixel will be described here as a comparative example. When the pixel of interest is a pixel 1205, and ref_dir is 1, the reference pixel is a pixel 1207, and the attribute of the pixel 1207 is a background attribute. It is thus determined in step S1003 that the attribute of the reference pixel is a replaced attribute, and the process advances to step S1004. Then, ref_dir becomes 2 in step S1005. If ref_dir is 2, the reference pixel is a pixel 1206, and the attribute of the pixel 1206 is the character attribute, and the process advances to step S1006 in step S1003. Since the opposite pixel is not referred to, the pixel 1205 of the pixel of interest becomes a target of correction processing, the pixel of interest is replaced by using the pixel value and attribute of the reference pixel, and a processing result is a pixel 1211 of an image 1220. When the pixel of interest is the pixel 1207, the reference pixel is a pixel 1208, and a processing result is a pixel 1210. If pixels are fattened by one pixel in each of leftward and rightward in the pixel 1205 and the pixel 1207, the pixel 1206 is the reference pixel for the pixel 1205, and the pixel 1208 is the reference pixel for the pixel 1207. Correction is performed to obtain processing results such as the pixel 1210 and the pixel 1211.

On the other hand, in this embodiment, referring to two opposite pixels, the pixel 1206 of the reference pixel and the pixel 1208 of the opposite pixel have the character attributes with respect to the pixel 1205. Furthermore, with respect to the pixel 1207, the pixel 1208 of the reference pixel and the pixel 1206 of the opposite pixel have the character attributes, and thus correction processing is not performed, obtaining processing results such as a pixel 1213 and a pixel 1214 of the image 1230. In a case in which a pixel is fattened by one pixel each of leftward and rightward, while the pixel 1205 and the pixel 1207 are collapsed in a method of the comparative example, a collapse does not occur in this embodiment.

Referring back to FIG. 10, in step S1009, the image attribute replacement unit 2024 replaces the pixel value of the pixel of interest with the pixel value of the reference pixel, fattening the pixel value of the reference pixel to the pixel of interest. That is, here, the character attribute of the pixel of interest is enlarged to the reference pixel, fattening the line width of a character. In step S1010, the image attribute replacement unit 2024 replaces the attribute of the pixel of interest by using the attribute of the reference pixel, fattening the attribute of the reference pixel to the pixel of interest.

Then, in step S1011, the image attribute selection unit 2025 outputs, to the gamma correction processing unit 203, the image data 606 and the attribute data 607 as the image data 608 and the attribute data 609 in the pixel of interest. Note that the image data 606 is image data in the pixel of interest corrected by the image attribute replacement unit 2024. The attribute data 609 is attribute data in the pixel of interest corrected by the image attribute replacement unit 2024. On the other hand, in step S1012, the image attribute selection unit 2025 outputs, to the gamma correction processing unit 203, the image data 601 and the attribute data 602 as the image data 608 and the attribute data 609 in the pixel of interest.

In step S1013, the image correction processing unit 202 determines whether processes are performed on all the pixels. If the processes are not complete for all the pixels, the process returns to step S1001. If the processes are complete for all the pixels, this processing ends.

As described above, image correction is not performed on portions such as the pixel 1205 and the pixel 1207 in which character visibility decreases when fattened with reference to two pixels in the opposite direction to the reference pixel. This makes it possible to perform image correction processing while minimizing a decrease in character visibility.

Third Embodiment

The third embodiment of the present invention will be described below. In the above second embodiment, the case in which the pixel is fattened by two pixels has been described. In this embodiment, a case will be described in which the range of a pixel to be referred to is changed depending on a direction. In the above-described second embodiment, a correction target pixel is determined with reference to the reference pixel, the pixel of interest, and two pixels on a side opposite to the reference pixel in a correction determination. However, while background attributes having one-pixel and two-pixel widths surrounded by character attributes are not correction targets, background attributes having three-pixel and four- or more pixel widths surrounded by character attributes are determined as correction targets. At this time, the background attribute having three-pixel width has one-pixel width after correction and becomes thinner than the background attribute having two-pixel width originally. This reverses a relationship between the pixel widths (for example, line widths) of an input image. To prevent this, in this embodiment, control that performs correction processing while maintaining the relationship between the pixel widths of the input image will be described. In this embodiment, a case will be described in which a pixel is fattened by one pixel each of leftward and rightward as in the above second embodiment. Note that only a difference from the above second embodiment will be described in detail below.

Image Correction Processing

Image correction processing by an image correction processing unit 202 in the third embodiment will be described. First, the positional relationship of pixels used by the image correction processing unit 202 will be described with reference to FIG. 14.

Figure 14:
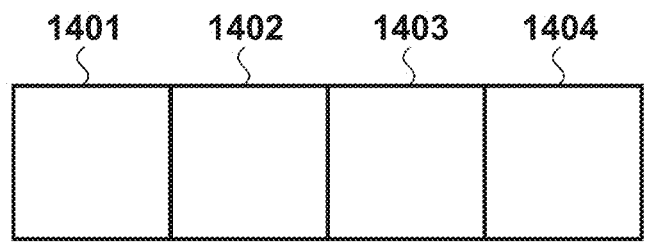
FIG. 14 is a view for explaining the image correction processing according to the embodiment.

According to this embodiment, as shown in FIG. 14, image data of four pixels, namely, a pixel 1401, a pixel 1402, a pixel 1403, and a pixel 1404 and corresponding attribute data are input from a color conversion processing unit 201 to the image correction processing unit 202. A pixel of interest to be a target of the image correction processing is arranged in the pixel 1403. In this embodiment, the pixel is fattened by one pixel for each of leftward and rightward, and thus the directions (ref_dir) of reference pixels with respect to the pixel of interest are two directions of the left and right. With respect to the pixel 1403 of the pixel of interest, the direction of the pixel 1402 is ref_dir=1. Then, with respect to the pixel 1403 of the pixel of interest, the direction of the pixel 1404 is ref_dir=2. Then, pixels adjacent to the reference pixels in opposite directions to the pixel of interest (opposite pixels) exist for the respective reference pixels.

The opposite pixels to the pixel 1404 of the reference pixel are two pixels, namely, the pixel 1402 and the pixel 1401. The opposite pixel to the pixel 1402 of the reference pixel includes one pixel, namely, the pixel 1404. In the second embodiment, two pixels are arranged as the opposite pixels to the pixel 1202 of the reference pixel. In this embodiment, however, only one pixel is arranged as the opposite pixel to the pixel 1402 of the reference pixel. Note that distances (re_dis) of the respective opposite pixels from the pixel of interest are 1 for the pixel 1402 and 2 for the pixel 1401.

A detailed operation of each processing unit that forms the image correction processing unit 202 will be described next. Flags 603, 604, and 605, image data 601 and 606 in the pixel of interest, and attribute data 602 and 607 are input to an image attribute selection unit 2025. Based on these inputs, the image attribute selection unit 2025 outputs image data 608 and attribute data 609 in the pixel of interest to a gamma correction processing unit 203. This output operation will be described with reference to a flowchart in FIG. 13 and FIGS. 15A-15C.

Figure 15A:
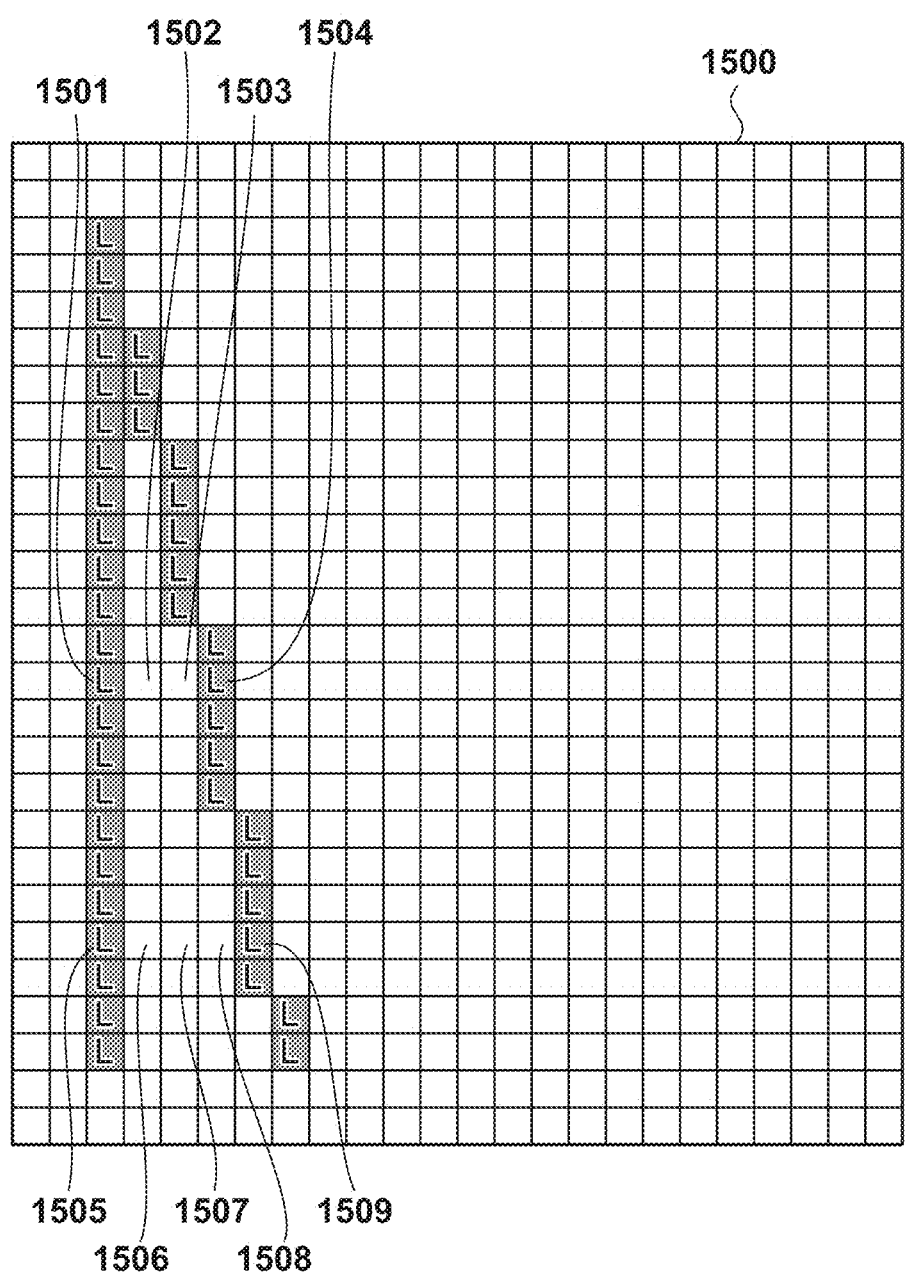
FIGS. 15A-15C show views for explaining the image correction processing according to the embodiment.
Figure 15B:
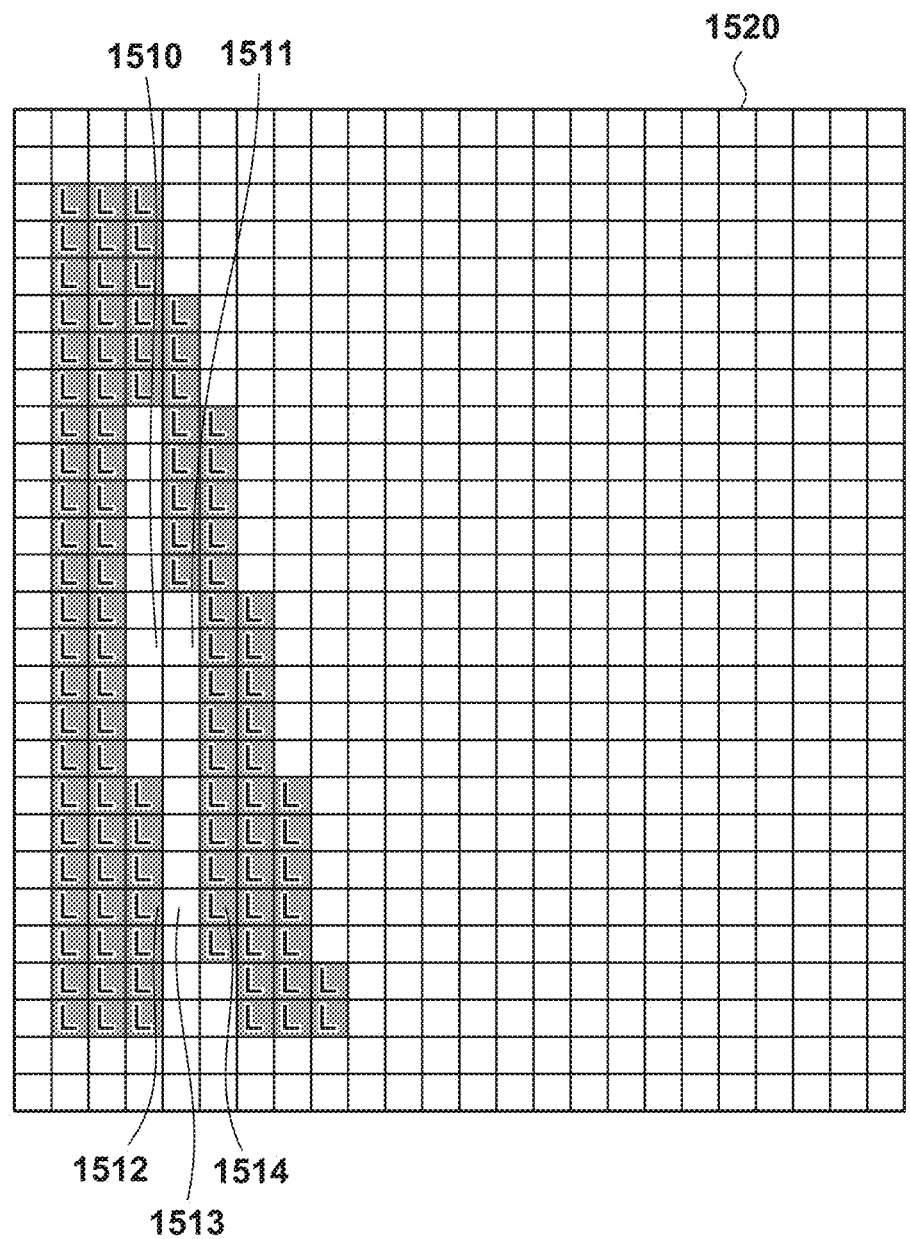
Figure 15C:
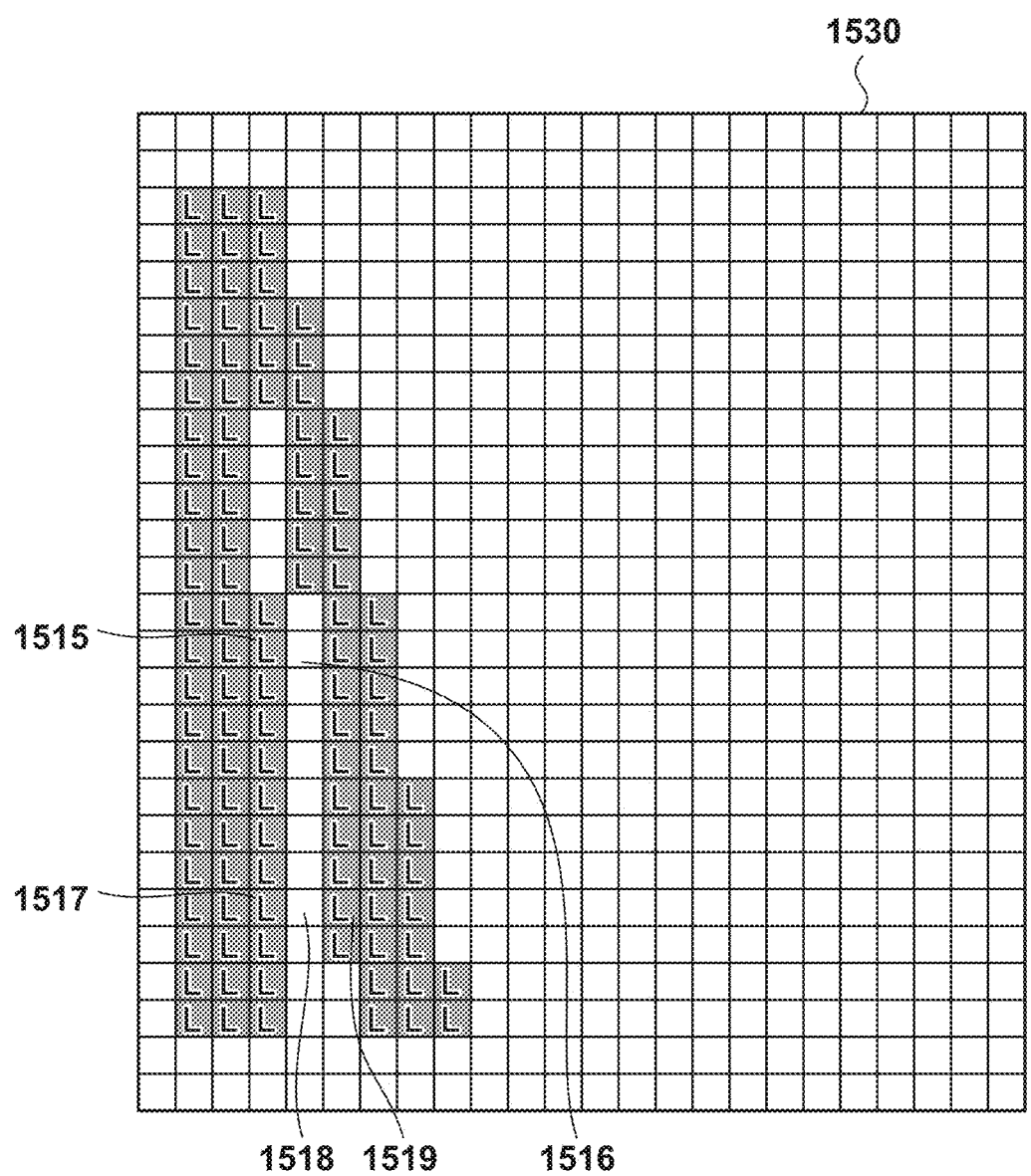

FIG. 13 shows the flowchart of image correction processing performed by the image correction processing unit 202. Note that processes to be described below are executed by the image correction processing unit 202 under an instruction by a CPU 102. More specifically, these processes are implemented by, for example, causing the CPU 102 to load programs stored in a ROM 104 into a RAM 103 and execute them. FIGS. 15A-15C show the image processing performed by the image correction processing unit 202 in this embodiment in detail. In FIGS. 15A-15C, white pixels indicate pixels each having a background attribute, and black pixels indicate pixels each having a line attribute. An image 1500 is an attribute image input to the image correction processing unit 202. An image 1520 is a processing result in a case in which the image correction processing is performed with reference to only a pixel of interest and a reference pixel. An image 1530 is a processing result in a case in which the image correction processing in this embodiment is performed. A description will be given here by taking, as an example, a case in which the CPU 102 notifies the image correction processing unit 202 that replacing attributes are a character and a line, and replaced attributes are an image, a graphic, and a background. A description will be given below by paying attention to a pixel 1502, a pixel 1503, a pixel 1506, a pixel 1507, and a pixel 1508.

In step S1301, the image correction processing unit 202 sets an initial value of each parameter. More specifically, the image correction processing unit 202 sets 1 to ref_dir and re_dis. In step S1302, the image attribute selection unit 2025 refers to the flag 603. If the flag 603 indicates that the attribute of the pixel of interest matches the replaced attribute (YES in step S1302), the process advances to step S1303; otherwise (NO in step S1302), the process advances to step S1313. If the pixel of interest does not have the replaced attribute, it is not the target of correction processing, and thus the process advances to step S1313 in which the image attribute selection unit 2025 outputs input data. For example, when the pixel of interests are the pixel 1502 and the pixel 1503, each pixel of interest has the background attribute which matches the replaced attribute in step S1302, and thus the process advances to step S1303. Likewise, when the pixel of interests are the pixel 1506, the pixel 1507, and the pixel 1508, each pixel of interest has the background attribute, and thus the process advances to step S1303.

In steps S1303 to S1306, it is determined whether the attributes of all the reference pixels match the replacing attributes. In step S1303, the image attribute selection unit 2025 refers to the flag 604. If the flag 604 indicates that the attribute of each reference pixel matches the replacing attribute (YES in step S1303), the process advances to step S1307; otherwise (NO in step S1303), the process advances to step S1304.

In step S1304, the image attribute selection unit 2025 determines whether all reference directions are referred to. In this embodiment, the maximum value of ref_dir is 2, and it is thus determined whether ref_dir is 2. If ref_dir is 2 (YES in step S1304), the process advances to step S1313; otherwise (NO in step S1304), the process advances to step S1305. In step S1305, the image correction processing unit 202 adds 1 to ref_dir in order to change the direction of each reference pixel, and then the process advances to step S1306.

In step S1306, the image correction processing unit 202 decides the maximum distance (DIS_MAX) of the opposite pixel in accordance with the reference direction. The opposite pixel is the pixel 1404 when ref_dir is 1, and thus DIS_MAX is 1. On the other hand, the opposite pixels are the pixel 1402 and the pixel 1401 when ref_dir is 2, and thus DIS_MAX is 2. For example, when the pixel of interest is the pixel 1502, ref_dir is 1, and thus the reference pixel is a pixel 1501. The pixel 1501 has the line attribute which matches the replacing attribute in step S1303, and thus the process advances to step S1307. When the pixel of interest is the pixel 1503, a pixel 1504 of the reference pixel has the line attribute which matches the replacing attribute in step S1303, and thus the process advances to step S1307. When the pixel of interest is the pixel 1506, a pixel 1505 of the reference pixel has the line attribute which matches the replacing attribute in step S1303, and thus the process advances to step S1307. When the pixel of interest is the pixel 1507, both the pixel 1506 and the pixel 1507 of the reference pixels have the background attributes which are different from the replacing attributes in steps S1303 to S1306, and thus the process advances to step S1313, and correction processing is not applied to the pixel 1507. When the pixel of interest is the pixel 1508, a pixel 1509 of the reference pixel has the line attribute which matches the replacing attribute in step S1303, and thus the process advances to step S1307.

In steps S1307 to S1309, it is determined whether the attributes of all the opposite pixels match the attributes of the reference pixels. In step S1307, the image attribute selection unit 2025 refers to the flag 605. If the flag 605 indicates that the attribute of each opposite pixel matches that of a corresponding one of the reference pixels (YES in step S1307), the process advances to step S1308; otherwise (NO in step S1307), the process returns to step S1304.

In step S1308, the image correction processing unit 202 determines whether all the opposite pixels are referred to. In this embodiment, the number of opposite pixels changes depending on the direction. The image correction processing unit 202 determines whether re_dis matches DIS_MAX and determines whether processes are performed on all the opposite pixels. If re_dis matches DIS_MAX, the image correction processing unit 202 determines that the processes are performed on all the opposite pixels, and the process advances to step S1310. If re_dis does not match DIS_MAX, the image correction processing unit 202 determines that the processes are not performed on all the opposite pixels, and the process advances to step S1309 in which the next opposite pixel is determined.

In step S1309, the image correction processing unit 202 adds 1 to re_dis in order to change the opposite pixel to be referred to, and the process returns to step S1307 in which it is determined whether the attribute of the changed opposite pixel matches that of the reference pixel. For example, when the pixel of interest is the pixel 1502, the reference pixel is the pixel 1501, and thus the opposite pixel is the pixel 1503. The pixel 1503 has the background attribute which is different from the line attribute of the pixel 1501 of the reference pixel, and thus the process advances to step S1310 in which correction processing is performed. A processing result of the pixel 1502 in this embodiment is a pixel 1515 of the image 1530.

When the pixel of interest is the pixel 1503, the reference pixel is the pixel 1504, and the opposite pixels are the pixel 1501 and the pixel 1502. The pixel 1504 of the reference pixel and the pixel 1501 of the opposite pixel have the same line attribute, and thus the process advances to step S1313, and correction processing is not performed. A processing result of the pixel 1503 in this embodiment is a pixel 1516 of the image 1530.

Subsequently, the pixel 1506 includes the pixel 1505 of the reference pixel and the pixel 1507 of the opposite pixel, the pixel 1505 has the line attribute, and the pixel 1507 of the opposite pixel has the background attribute, and thus the correction processing is performed. A processing result of the pixel 1506 in this embodiment is a pixel 1517 of the image 1530. Likewise, the pixel 1508 includes the pixel 1509 of the reference pixel, and the pixel 1507 and the pixel 1506 of the opposite pixels, the pixel 1505 has the line attribute, and both the opposite pixels have the background attributes, and thus the correction processing is performed. A processing result of the pixel 1508 in this embodiment is a pixel 1519 of the image 1530.

A case in which the image 1500 is processed by a method in the above second embodiment will be described here. When the pixel of interest is the pixel 1502, the pixel 1501 is the reference pixel, and the pixel 1503 and the pixel 1504 are the opposite pixels. However, because the pixel 1501 of the reference pixel and the pixel 1504 of the opposite pixel have the same line attribute, it is determined in step S1006 that the attribute of the opposite pixel and the attribute of the reference pixel match, and the correction processing is not performed. Therefore, a processing result of the pixel 1502 in the above-described second embodiment is a pixel 1510 of the image 1520.

Likewise, when the pixel of interest is the pixel 1503, the pixel 1504 is the reference pixel, and the pixel 1501 and the pixel 1502 are the opposite pixels. However, because the pixel 1504 of the reference pixel and the pixel 1501 of the opposite pixel have the same line attribute, it is determined in step S1006 that the attribute of the opposite pixel and the attribute of the reference pixel match, and the correction processing is not performed. A processing result of the pixel 1503 in the above-described second embodiment is a pixel 1511 of the image 1520. When the pixel of interest is the pixel 1506, the pixel 1505 is the reference pixel, and the pixel 1507 and the pixel 1508 are the opposite pixels. Because the pixel 1505 of the reference pixel and the opposite pixels have different attributes, it is determined in step S1006 that the attributes of the opposite pixels and the attribute of the reference pixel do not match, and the correction processing is performed. A processing result of the pixel 1506 in the above-described second embodiment is a pixel 1512 of the image 1520.

When the pixel of interest is the pixel 1507, both the pixel 1506 and the pixel 1508 of the reference pixels have the background attributes, and thus the correction processing is not performed. A processing result of the pixel 1507 in the second embodiment is a pixel 1513 of the image 1520. When the pixel of interest is the pixel 1508, the pixel 1509 is the reference pixel, and the pixel 1506 and the pixel 1507 are the opposite pixels. Because the pixel 1509 of the reference pixel and the opposite pixels have different attributes, it is determined in step S1006 that the attributes of the opposite pixels and the attribute of the reference pixel do not match, and the correction processing is performed. A processing result of the pixel 1508 in the above-described second embodiment is a pixel 1514 of the image 1520.

As shown in the image 1500, a distance of two pixels of the pixel 1502 and the pixel 1503 exists between a vertical line that includes the pixel 1501 and a vertical line that includes the pixel 1504. A distance of three pixels of the pixel 1506, the pixel 1507, and the pixel 1508 exists between a vertical line that includes the pixel 1505 and a vertical line that includes the pixel 1509. However, as shown in the image 1520 of the processing result in the above-described second embodiment, intervals of the respective lines are reversed. More specifically, the interval between the pixel 1501 and the pixel 1504 still includes two pixels of the pixel 1510 and the pixel 1511 because a collapse occurs when fattened by two pixels. However, the interval between the pixel 1505 and the pixel 1509 includes one pixel of the pixel 1513 as a result of being fattened by two pixels. Thus, the interval between the pixel 1505 and the pixel 1508 becomes narrower than the interval between the pixel 1501 and the pixel 1504.

On the other hand, according to this embodiment, the intervals of the respective lines are not reversed. The interval between the pixel 1501 and the pixel 1504 includes one pixel of the pixel 1515 by being fattened by one pixel. The interval between the pixel 1505 and the pixel 1509 includes one pixel of a pixel 1518 by being fattened by two pixels. It is therefore found that the relationship of the interval between the pixel 1505 and the pixel 1509, and the interval between the pixel 1501 and the pixel 1504 is not reversed.

Referring back to FIG. 13, in step S1310, an image attribute replacement unit 2024 replaces the pixel value of the pixel of interest with the pixel value of the reference pixel, fattening the pixel value of the reference pixel to the pixel of interest. That is, here, the character attribute of the pixel of interest is enlarged to the reference pixel, fattening the line width of a character. In step S1311, the image attribute replacement unit 2024 replaces the attribute of the pixel of interest with the attribute of the reference pixel, fattening the attribute of the reference pixel to the pixel of interest.

In step S1312, the image attribute selection unit 2025 outputs, to the gamma correction processing unit 203, the image data 606 and the attribute data 607 as the image data 608 and the attribute data 609 in the pixel of interest. Note that the image data 606 is image data in the pixel of interest corrected by the image attribute replacement unit 2024. The attribute data 609 is attribute data in the pixel of interest corrected by the image attribute replacement unit 2024.

In step S1313, the image attribute selection unit 2025 outputs, to the gamma correction processing unit 203, the image data 601 and the attribute data 602 as the image data 608 and the attribute data 609 in the pixel of interest. In step S1314, the image correction processing unit 202 determines whether processes are performed on all the pixels. If the processes are not complete for all the pixels, the process returns to step S1301. If the processes are complete for all the pixels, this processing ends.

As described above, in this embodiment, a pixel-width relationship is not reversed by setting the width of a pixel in the opposite direction to the reference pixel when fattened rightward from two pixels to one pixel.

The present invention is not limited to the above-described embodiments, and various modifications are possible. For example, a user can select respective fattening algorithms in the above-described first to third embodiments. In this case, a result of performing processing in each embodiment on an exemplary character may be displayed on a display unit as a sample.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-011390 filed on Jan. 25, 2017, which is hereby incorporated by reference herein in its entirety.

What is claimed is:

1. An image processing apparatus comprising:
a controller, comprising (a) at least one processor which executes instructions stored in at least one memory, (b) at least one circuit, or (c) a combination of the at least one processor and the at least one circuit, the controller being configured to:
(1) acquire image data; and
(2) correct, in an execution of a fattening processing, a density of a pixel of interest associated with a first attribute based on a density of a reference pixel associated with a second attribute different from the first attribute and being adjacent to the pixel of interest on one side of the pixel of interest, in a case where a first opposite pixel and a second opposite pixel are associated with the first attribute, wherein the first opposite pixel and the second opposite pixel exist on an opposite side to the one side of the pixel of interest, the first opposite pixel is adjacent to the pixel of interest, and the second opposite pixel is adjacent to the first opposite pixel, wherein the density of the pixel of interest is not corrected in the execution of the fattening processing based on the density of the reference pixel in a case where at least one of the first opposite pixel and the second opposite pixel is associated with the second attribute.

2. The apparatus according to claim 1, wherein the controller is configured to correct the density of the pixel of interest in a case where an attribute of the pixel of interest is different from a character attribute, an attribute of the reference pixel is a character attribute, and attributes of the first opposite pixel and the second opposite pixel are different from the character attribute.

3. The apparatus according to claim 2, wherein the controller is configured not to correct, in the execution of the fattening processing, the density of the pixel of interest in a case where the attribute of the pixel of interest is different from the character attribute, the attribute of the reference pixel is the character attribute, and at least one of attributes of the first opposite pixel and the second opposite pixel is the character attribute.

4. The apparatus according to claim 1, wherein the controller is configured to, in a case where it has been determined to correct a density of the pixel of interest, determine an attribute of the pixel of interest to be the same attribute as an attribute of the reference pixel.

5. The apparatus according to claim 1, wherein an attribute associated with one pixel included in the image data is any of a character attribute, an image attribute, a graphic attribute, and a background attribute.

6. The apparatus according to claim 1, wherein the controller is configured to acquire rasterized image data in the acquisition.

7. The apparatus according to claim 2, wherein a process to decide a density of the pixel of interest is processing for making an object associated with a character attribute more bold.

8. The apparatus according to claim 2, wherein the controller is configured to perform a process to determine whether or not to correct a density of the pixel of interest and a process to decide a density of the pixel of interest, in a case where a setting for performing a process to make an object having a character attribute more bold is valid.

9. The apparatus according to claim 2, wherein the first opposite pixel and the second opposite pixel are pixels existing on the opposite side in a horizontal direction with respect to the reference pixel.

10. The apparatus according to claim 2, wherein the first opposite pixel and the second opposite pixel are pixels existing on the opposite side in a vertical direction with respect to the reference pixel.

11. The apparatus according to claim 1, wherein the controller is configured to, in a case where it has been determined to correct a density of the pixel of interest, (a) replace an attribute of the pixel of interest with an attribute of the reference pixel, and (b) execute a gamma process for the image data based on the replaced attribute.

12. The apparatus according to claim 11, wherein in the gamma process, a first gamma process is executed for pixels associated with the first attribute, and a second gamma process is executed for pixels associated with the second attribute different from the first attribute.

13. The apparatus according to claim 1, wherein the controller is configured to, in a case where it has been determined to correct a density of the pixel of interest, (a) replace an attribute of the pixel of interest with an attribute of the reference pixel, and (b) execute a screen process for the image data based on the replaced attribute.

14. The apparatus according to claim 13, wherein in the screen process, a screen process with a first screen ruling is executed for pixels having the first attribute, and a screen process with a second screen ruling is executed for pixels having the second attribute different from the first attribute.

15. A control method of controlling an image processing apparatus, the method comprising:

acquiring image data; and correcting, in an execution of a fattening processing, a density of a pixel of interest associated with a first attribute based on a density of a pixel of interest associated with a first attribute based on a density of a reference pixel associated with a second attribute different from the first attribute and being adjacent to the pixel of interest on one side of the pixel of interest, in a case where a first opposite pixel and a second opposite pixel are associated with the first attribute, wherein the first opposite pixel and the second opposite pixel exist on an opposite side to the one side of the pixel of interest, the first opposite pixel is adjacent to the pixel of interest, and the second opposite pixel is adjacent to the first opposite pixel, wherein the density of the pixel of interest is not corrected in the execution of the fattening processing based on the density of the reference pixel in a case where at least one of the first opposite pixel and the second pixel is associated with the second attribute.

16. A non-transitory computer-readable storage medium storing a computer program for causing a computer to execute a control method of controlling an image processing apparatus, the method comprising:

acquiring image data; and correcting, in an execution of a fattening processing, a density of a pixel of interest associated with a first attribute based on a density of a reference pixel associated with a second attribute different from the first attribute and being adjacent to the pixel of interest on one side of the pixel of interest, in a case where a first opposite pixel and a second opposite pixel are associated with the first attribute, wherein the first opposite pixel and the second opposite pixel exist on an opposite side to the one side of the pixel of interest, the first opposite pixel is adjacent to the pixel of interest, and the second opposite pixel is adjacent to the first opposite pixel, wherein the density of the pixel of interest is not corrected in the execution of the fattening processing based on the density of the reference pixel in a case where at least one of the first opposite pixel and the second pixel is associated with the second attribute.

* * * * *